US012654401B2

(12) United States Patent
Kinugawa et al.

(10) Patent No.: US 12,654,401 B2
(45) Date of Patent: Jun. 16, 2026

(54) WELDING DEVICE AND METHOD FOR MANUFACTURING RESIN WELDED WORKPIECE

(71) Applicant: KABUSHIKI KAISHA TOYOTA JIDOSHOKKI, Kariya (JP)

(72) Inventors: Tatsuya Kinugawa, Kariya (JP); Kyohei Oda, Kariya (JP); Yasuyuki Oshima, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 97 days.

(21) Appl. No.: 18/711,468

(22) PCT Filed: Sep. 14, 2022

(86) PCT No.: PCT/JP2022/034402
§ 371 (c)(1),
(2) Date: May 17, 2024

(87) PCT Pub. No.: WO2023/089931
PCT Pub. Date: May 25, 2023

(65) Prior Publication Data
US 2025/0001703 A1 Jan. 2, 2025

(30) Foreign Application Priority Data
Nov. 22, 2021 (JP) ................................. 2021-189617

(51) Int. Cl.
B29C 65/18 (2006.01)
B29C 65/78 (2006.01)
(52) U.S. Cl.
CPC .......... B29C 65/7841 (2013.01); B29C 65/18 (2013.01); B29C 65/7888 (2013.01)

(58) Field of Classification Search
CPC . B29C 65/18; B29C 65/7841; B29C 65/7888; B29C 66/00441; B29C 66/472; B29C 66/7392; B29C 66/81457
(Continued)

(56) References Cited

U.S. PATENT DOCUMENTS 6,736,918 B1     5/2004  Ichikawa et al.
7,536,837 B2 *   5/2009  Perkins ............... B29C 66/8122
                                                53/284.7
(Continued)

FOREIGN PATENT DOCUMENTS

GB        1164368 A      9/1969
JP     2001-063256 A     3/2001
(Continued)

OTHER PUBLICATIONS

International Search Report for PCT/JP2022/034402 dated Oct. 18, 2022.
(Continued)

*Primary Examiner* — James D Sells
(74) *Attorney, Agent, or Firm* — Sughrue Mion, PLLC

(57) ABSTRACT

A welding device that welds a resin portion to a workpiece includes a heating member that heats the resin portion to melt the resin portion, a pressing member that presses the resin portion having been melted against the workpiece via a sheet material in a pressing direction to weld the resin portion to the workpiece, a pair of support members that is disposed away from each other in a moving direction of the sheet material that intersects the pressing direction, and supports the sheet material so that the sheet material covers the pressing surface in the pressing direction, a moving mechanism that slides the sheet material supported by the support members in the moving direction, and a control circuit that determines whether the sheet material is to be (Continued)

slid, and controls the moving mechanism so that the sheet material is slid when a determination result is positive.

7 Claims, 10 Drawing Sheets

(58) Field of Classification Search
USPC ...................................................... 156/583.1
See application file for complete search history.

(56)                    References Cited

U.S. PATENT DOCUMENTS

| | | |
|---|---|---|
| 2006/0090845 A1 | 5/2006 | Shimowaki et al. |
| 2007/0084566 A1 | 4/2007 | Seki et al. |

FOREIGN PATENT DOCUMENTS

| | | |
|---|---|---|
| JP | 2016-126826 A | 7/2016 |
| JP | 2021-142643 A | 9/2021 |

OTHER PUBLICATIONS

Written Opinion for PCT/JP2022/034402 dated Oct. 18, 2022.
Extended European Search Report dated Feb. 13, 2025, issued in European Application No. 22893984.9.

* cited by examiner

WELDING DEVICE AND METHOD FOR MANUFACTURING RESIN WELDED WORKPIECE

CROSS REFERENCE TO RELATED APPLICATIONS

This application is a National Stage of International Application No. PCT/JP2022/034402 filed Sep. 14, 2022, claiming priority based on Japanese Patent Application No. 2021-189617 filed Nov. 22, 2021, the contents of all of which are incorporated herein by reference in their entirety.

TECHNICAL FIELD

The present disclosure relates to a welding device and a method for manufacturing a resin welded workpiece.

BACKGROUND ART

In Patent Document 1, a welding device that performs welding by heating and pressing a resin portion with a heat seal bar is disclosed. In the welding device disclosed in Patent Document 1, a fluororesin tape is affixed to a surface of the heat seal bar.

CITATION LIST

Patent Literature

[Patent Document 1] Japanese Patent Application Publication No. 2016-126826

SUMMARY OF THE INVENTION

Technical Problem

Here, when a pressing member such as the heat seal bar presses the resin portion with a sheet material such as a fluororesin tape interposed therebetween, a workpiece to which welding is performed and a resin portion are placed in contact with the sheet material. At this time, the sheet material may be worn, and deterioration of the sheet material may progress. In order to curb the decline in yield, it is required to replace the sheet material having deteriorated.

However, if changing the sheet material is complicated, an operation of the welding device needs to be stopped for a long time, and there is a concern that the operation efficiency of the welding device will decrease.

Solution to Problem

A welding device to solve the above problem is a welding device that welds a resin portion to a workpiece, the welding device including: a heating member configured to heat the resin portion to melt the resin portion; a pressing member configured to press the resin portion having been melted against the workpiece via a sheet material in a pressing direction to weld the resin portion to the workpiece, and having a pressing surface that presses the sheet material; a pair of support members disposed away from each other in a moving direction of the sheet material, the moving direction intersecting the pressing direction, and configured to support the sheet material so that the sheet material covers the pressing surface in the pressing direction; and a moving mechanism configured to slide the sheet material supported by the support members in the moving direction.

According to this, the pressing member presses the resin portion against the workpiece via the sheet material. As a result, the resin portion is welded to the workpiece. At this time, the sheet material is placed in contact with the resin portion instead of the pressing surface, so that welding of the resin portion to the pressing surface is suppressed.

In this configuration, when the deterioration of the sheet material progresses, the moving mechanism slides the sheet material in the moving direction with the sheet material supported by the support members. With the sheet material slid, a region of the sheet material that is different from the region of the sheet material in contact with the resin portion pressed in the previous welding is disposed between the pressing surface and the resin portion. That is, the region of the sheet material where the deterioration progresses may be changed. According to this, for example, the time and effort for releasing the sheet material and the pressing member that are in a fixed state for changing the region of the sheet material where deterioration progresses, as in a case where the sheet material and the pressing member are fixed, may be omitted. As a result, the sheet material disposed between the pressing member and the resin portion may be changed in a shorter time. Thus, the operation efficiency of the welding device may be increased.

In the above-mentioned welding device, the pressing surface has a rectangular shape, a direction in which a long side of the pressing surface extends is set as a long side direction, and the moving direction of the sheet material may intersect the long side direction.

According to this, since the moving direction intersects the long side direction, a moving distance of the sheet material when the sheet material covering the pressing surface is slid becomes shorter than when the moving direction is parallel to the long side direction. Accordingly, the time required for changing the sheet material can be shortened as compared to the case where the moving direction is parallel to the long side direction. Thus, the operation efficiency of the welding device may be further increased.

A method for manufacturing a resin welded workpiece to solve the above problem is a method for manufacturing a resin welded workpiece in which a resin portion is welded to the workpiece, the method including: a welding process in which the resin welded workpiece is manufactured by melting the resin portion placed on the workpiece and pressing the resin portion having been melted against the workpiece via a sheet material with a pressing member to weld the resin portion to the workpiece; and a moving process in which the sheet material is slid in a moving direction of the sheet material when the welding process is performed at least once, the moving direction intersecting a pressing direction in which the resin portion is pressed against the workpiece, wherein a region of the sheet material that is pressed by the pressing member in the welding process is defined as a sheet pressing region, and in the moving process, a region of the sheet material different, in the moving direction, from the sheet pressing region in the welding process before the moving process is slid to a position that is to be pressed in the welding process after the moving process.

According to this, the pressing member presses the melted resin portion against the workpiece via the sheet material to weld the resin portion to the workpiece. At this time, for example, the sheet material is placed in contact with the resin portion instead of the pressing member that presses the resin portion via the sheet material. Thus, the sheet material suppresses welding of the resin portion to the pressing member.

In this configuration, when the sheet material deteriorates due to the welding process, the sheet material slides in the moving direction in the moving process. As the sheet material slides, the region of the sheet material different from the sheet pressing region in the welding process prior to the moving process is placed in contact with the resin portion in the welding process after the moving process. Therefore, for example, the time and effort for releasing the sheet material and the pressing member that are in a fixed state required for changing the region of the sheet material where deterioration progresses, as in a case where the sheet material and the pressing member pressing the workpiece are fixed, may be omitted. As a result, the sheet material may be changed in a shorter time. Therefore, efficiency in manufacturing the resin welded workpiece may be improved.

Advantageous Effects of Invention

According to the present disclosure, an operation efficiency of the welding device may be increased.

DESCRIPTION OF EMBODIMENTS

Configuration of First Embodiment

Hereinafter, a welding device and a method for manufacturing an electrode unit using the welding device according to a first embodiment will be described.

<Electrode Unit 10>

Figure 1:
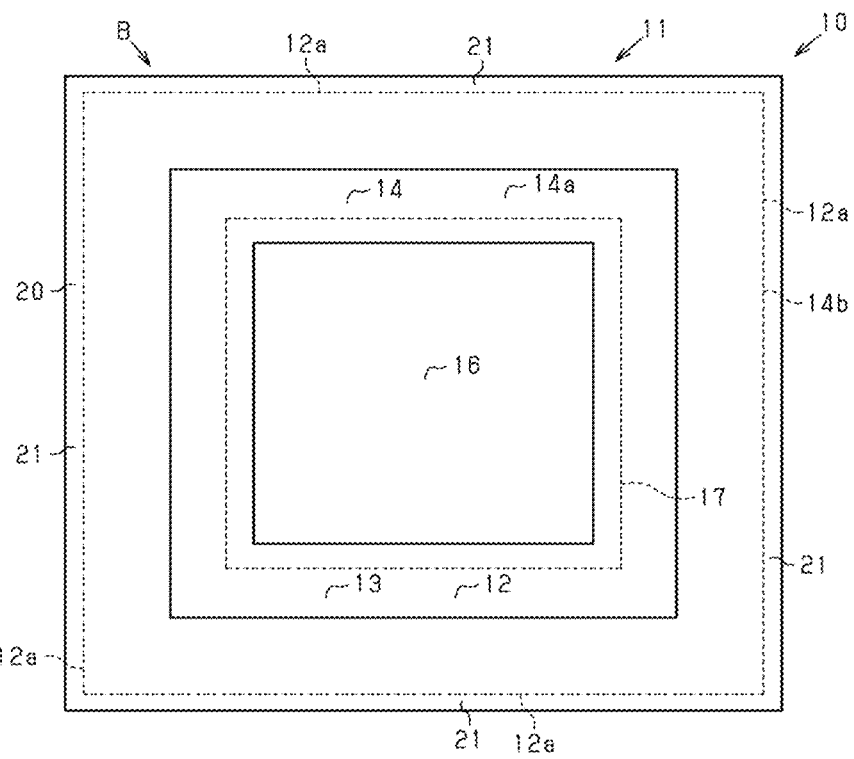
FIG. 1 is a plan view of an electrode unit.
Figure 2:
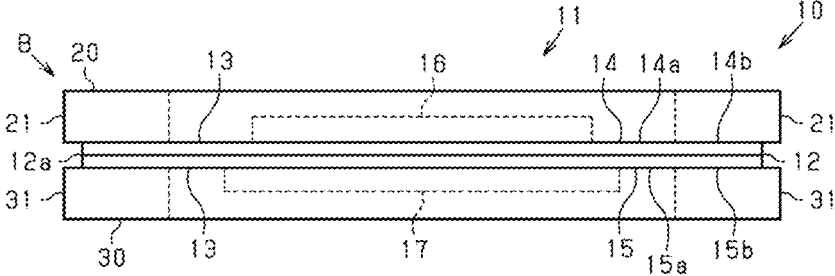
FIG. 2 is a side view of the electrode unit.

As illustrated in FIGS. 1 and 2, an electrode unit 10 includes an electrode plate 11, a first resin portion 20, and a second resin portion 30.

<Electrode Plate 11>

The electrode plate 11 as a workpiece is a bipolar electrode. The electrode plate 11 include a current collector 12, a first active material layer 16, and a second active material layer 17.

<Current Collector 12>

The current collector 12 is made of a metal foil. Examples of the current collector 12 include a copper foil, an aluminum foil, a titanium foil, or nickel foil. In view of securing the mechanical strength, the current collector 12 may be a stainless steel foil. Example of stainless steel foils includes SUS304, SUS316, and SUS301 as specified in JIS G 4305: 2015. The current collector 12 may be an alloy foil of the above mentioned metals or a plurality of the above metal foils integrated. Known plating or surface treatment may be applied to a surface of the current collector 12. The thickness of the current collector 12 is, for example, 1 μm or greater and 100 μm or less, and, more specifically, 5 μm or greater and 70 μm or less. The shape of the current collector 12 is a rectangular sheet. The current collector 12 has four edges 12a forming a periphery of the current collector 12. These four edges 12a forms the periphery of the electrode plate 11. That is, the shape of the electrode plate 11 is also a rectangular sheet. It can be also said that the electrode plate 11 has four edges 12a forming its periphery. It is noted that the electrode plate 11 is not limited to the above-mentioned form, but may have a form in which two metal foils are simply stacked.

<Main Surface 13>

The current collector 12 has a main surface 13. The main surface 13 is a surface perpendicular to a thickness direction of the current collector 12. The main surface 13 includes a first main surface 14 and a second main surface 15. The second main surface 15 is located opposite from the first main surface 14 in the thickness direction of the current collector 12.

<First Active Material Layer 16>

The first active material layer 16 as an active material layer includes a positive electrode active material. The positive electrode active material is capable of absorbing and discharging charge carriers such as lithium ions. Examples of the positive electrode active material include composite oxides, lithium metal, and sulfur. The first active material layer 16 may include a conductive aid, a binding agent, or another component, as necessary. The first active material layer 16 is adhered to the first main surface 14 integrally. The thickness of the first active material layer 16 is, for example, 2 to 150 μm. A publicly known method such as a roll coating method may be used for adhering the first active material layer 16 to the first main surface 14.

The first main surface 14 includes a first uncoated surface 14a. The first uncoated surface 14a is a region of the first main surface 14 where the first active material layer 16 is not adhered. The first uncoated surface 14a includes a first peripheral edge 14b which is a peripheral edge of the first main surface 14.

<Second Active Material Layer 17>

The second active material layer 17 as an active material layer includes a negative electrode active material. The negative electrode active material is capable of absorbing and discharging charge carriers such as lithium ions. Examples of the negative electrode active materials include graphite, carbon, metal compounds, elements that can be alloyed with lithium or compounds thereof, and carbon with boron. The second active material layer 17 may contain a conductive aid, a binding agent, and another component, as necessary. The thickness of the second active material layer 17 is, for example, 2 to 150 μm. The second active material layer 17 is adhered to the second main surface 15 integrally. The thickness of the second active material layer 17 is, for example, 2 to 150 μm. A publicly known method such as a roll coating method may be used for adhering the second active material layer 17 to the second main surface 15.

The second main surface 15 includes a second uncoated surface 15a. The second uncoated surface 15a is a region of the second main surface 15 to which the second active material layer 17 is not adhered. The second uncoated surface 15a includes a second peripheral edge 15b which is a peripheral edge of the second main surface 15.

<First Resin Portion 20>

The first resin portion 20 as a resin portion is formed in a frame shape. The first resin portion 20 is a rectangular frame. The first resin portion 20 is provided with four first resin edge portions 21. The first resin edge portions 21 each have a square column shape. The ends of the first resin edge portions 21 are connected to each other. Each of the first resin edge portions 21 faces one of the other first resin edge portions 21.

The first resin portion 20 is welded to the first main surface 14. Specifically, the first resin portion 20 is welded to the first uncoated surface 14a. The first resin portion 20 is welded along the first peripheral edge 14b. Thus, the first resin edge portions 21 are welded along the edges 12a of the electrode plate 11. It can be also said that the first resin portion 20 is welded to the first main surface 14 so as to surround the first active material layer 16. A portion of the first resin portion 20 protrudes from the first peripheral edge 14b all around the first peripheral edge 14b in a direction away from a region to which the first active material layer 16 is adhered.

The portion of the first resin portion 20 protruding from the first peripheral edge 14b and a portion of the second resin portion 30 protruding from the second peripheral edge 15b may be adhered to each other.

<Second Resin Portion 30>

The second resin portion 30 as a resin portion is formed in a frame shape. The second resin portion 30 is a rectangular frame. The second resin portion 30 is provided with four second resin edge portions 31. The second resin edge portions 31 each have a square column shape. The ends of the second resin edge portions 31 are connected to each other. Each of the second resin edge portions 31 faces one of the other second resin edge portions 31.

The second resin portion 30 is welded to the second main surface 15. Specifically, the second resin portion 30 is welded to the second uncoated surface 15a. The second resin portion 30 is welded along the second peripheral edge 15b. Thus, the second resin edge portions 31 are welded along the edges 12a of the electrode plate 11. It can be also said that the second resin portion 30 is welded to the second main surface 15 so as to surround the second active material layer 17. A portion of the second resin portion 30 protrudes from the second peripheral edge 15b all around the second peripheral edge 15b in a direction away from a region to which the second active material layer 17 is adhered.

The first resin portion 20 and the second resin portion 30 are made of resin having electrical insulation properties. For materials of the first resin portion 20 and the second resin portion 30, various resin materials such as polyethylene (PE), polystyrene (PS), polypropylene (PP), ABS resin, and AS resin, and modified resin materials thereof may be used.

<Power Storage Module B>

The electrode units 10 configured in this manner are stacked with the resin portions 20, 30 interposed therebetween to form a power storage module B. In the electrode units 10, a portion of the first resin portion 20 protruding from the peripheral edge 14b of one of the electrode units 10 disposed side by side and a portion of the second resin portion 30 protruding from the peripheral edge 15b of the other of the electrode units 10 disposed side by side are integrated. The portions protruding from the peripheral edges 14b, 15b may be integrated by welding or adhering with an adhesive member of such portions. A resin material exemplified by the resin portions 20, 30 is used as the adhesive member. The storage module B of the present embodiment is a bipolar lithium-ion storage battery. The power storage module B is used for a battery of various vehicles such as a forklift truck, a hybrid vehicle, and an electric vehicle.

<Welding Device 40>

Next, an example of a welding device 40 will be described with reference to FIGS. 3 to 6. The welding device 40 presses and welds the resin portions 20, 30 to the electrode plate 11 as a workpiece to manufacture the electrode unit 10. In other words, the welding device 40 is an electrode unit manufacturing device. In the following, for the sake of description, a direction in which the welding device 40 presses the workpiece is referred to as a pressing direction Z. In the method for manufacturing the electrode unit 10 of the present embodiment, two welding devices 40 are used. Here, a configuration of one of the welding devices 40 will be described.

Figure 3:
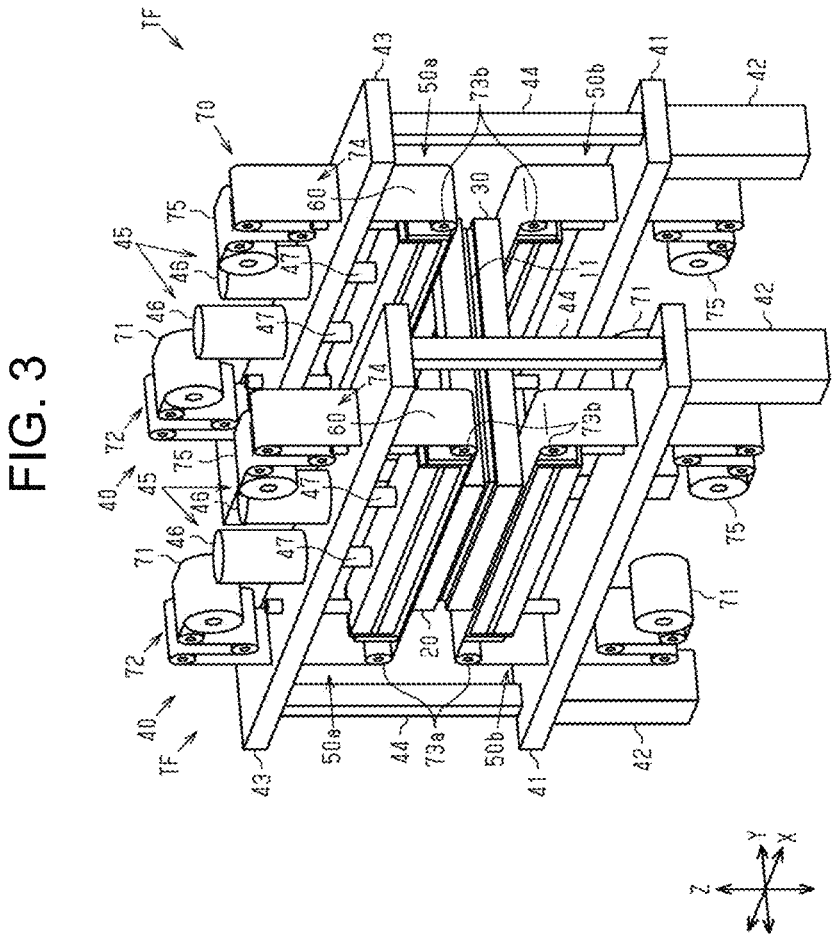
FIG. 3 is an overall perspective view of a welding device according to a first embodiment.

As illustrated in FIG. 3, the welding device 40 includes a lower base 41 having a plate shape, two legs 42, an upper base 43 having a plate shape, two supports 44, and a cylinder unit 45. Each of the legs 42 supports the lower base 41 against the ground.

The upper base 43 is spaced from the lower base 41 in a thickness direction of the lower base 41. A thickness direction of the upper base 43 is parallel to the thickness direction of the lower base 41. The thickness direction of the lower base 41 is parallel to the vertical direction. The vertical direction is a direction in which gravity acts on an object. In the following, for the sake of description, the vertical direction may be referred to as an up-down direction. In the present embodiment, both the up-down direction and the vertical direction are parallel to the pressing direction Z.

Each of the supports 44 supports the upper base 43 relative to the lower base 41. Each of the supports 44 extends in the pressing direction Z.

<Cylinder Unit 45>

The cylinder unit 45 includes a cylinder body 46 and a cylinder rod 47.

The cylinder body 46 is fixed to the upper base 43. A servo motor (not illustrated) is accommodated inside the cylinder body 46.

The cylinder rod 47 extends through the upper base 43 in the pressing direction Z. The cylinder rod 47 is configured to move in and out relative to the cylinder body 46 in the pressing direction Z. The cylinder rod 47 moves in and out relative to the cylinder body 46, for example, by operation of the servo motor.

Figure 4:
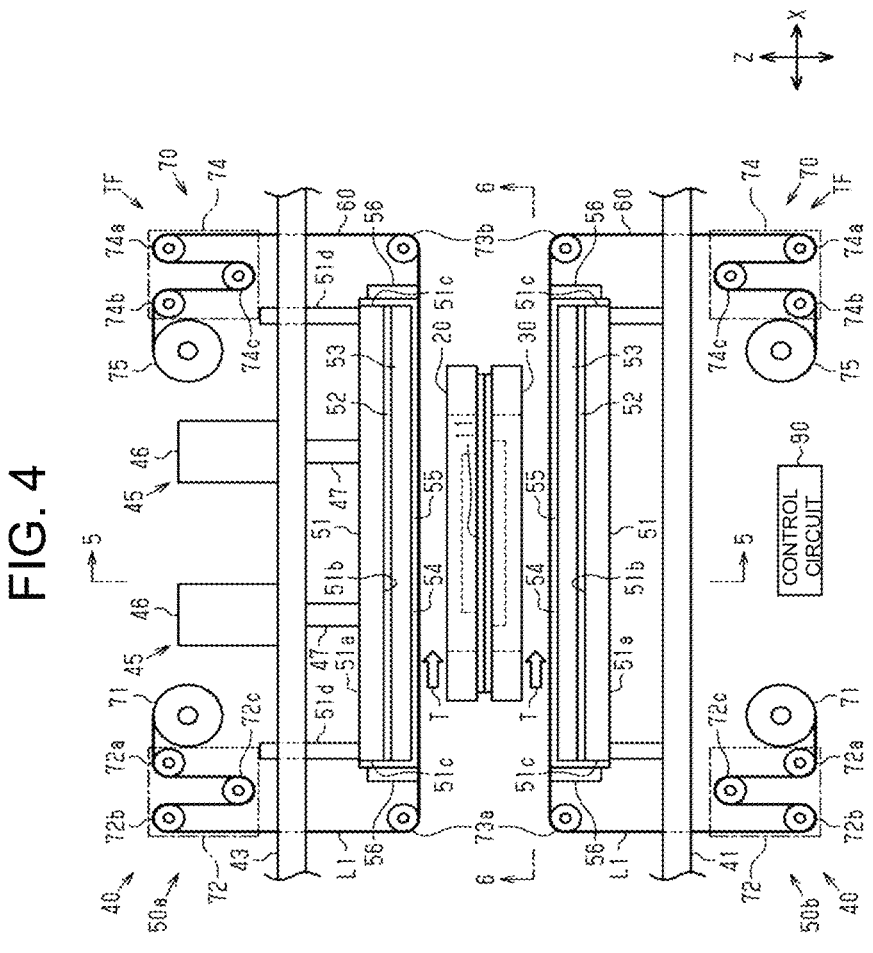
FIG. 4 is an enlarged front view of the welding device of the first embodiment.

As illustrated in FIG. 4, the welding device 40 includes a first pressing assembly 50a, a second pressing assembly 50b, and a control circuit 90.

<Pressing Assemblies 50a, 50b>

The two pressing assemblies 50a, 50b each are disposed between the lower base 41 and the upper base 43. The first pressing assembly 50a is supported by the upper base 43 with the cylinder unit 45. The first pressing assembly 50a is connected to the cylinder rod 47. The first pressing assembly 50a is movable in the pressing direction Z with operation of the cylinder unit 45, for example, by moving the cylinder rod 47 in and out.

The second pressing assembly 50b is supported by the lower base 41. In the present embodiment, the second pressing assembly 50b is fixed to the lower base 41. The first pressing assembly 50a and the second pressing assembly 50b face each other in the pressing direction Z. It can be also said that the pressing direction Z is a direction in which the two pressing assemblies 50a, 50b face each other. The welding device 40 of the present embodiment is a so-called servo press that moves the first pressing assembly 50a with the operation of the servo motor. The welding device 40 is not limited to this, and may be, for example, a so-called hydraulic press using a hydraulic pump.

Figure 5:
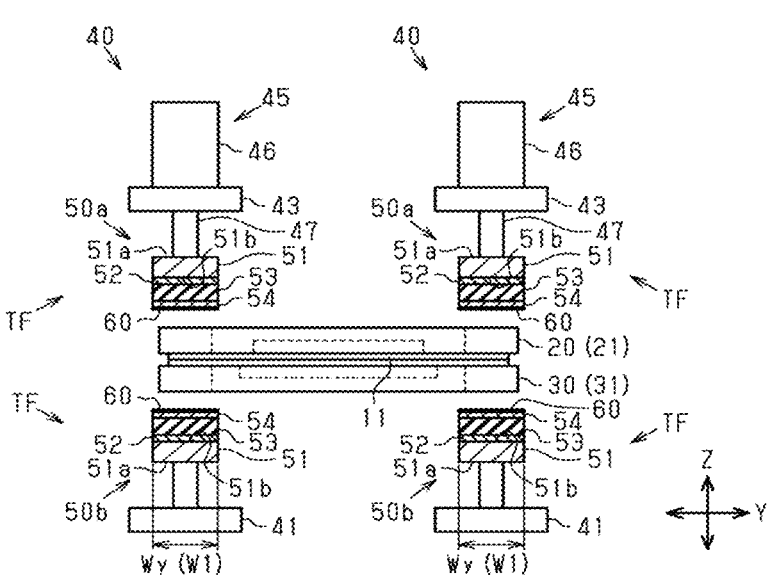
FIG. 5 is a cross-sectional view, taken along line V-V of FIG. 4.
Figure 6:
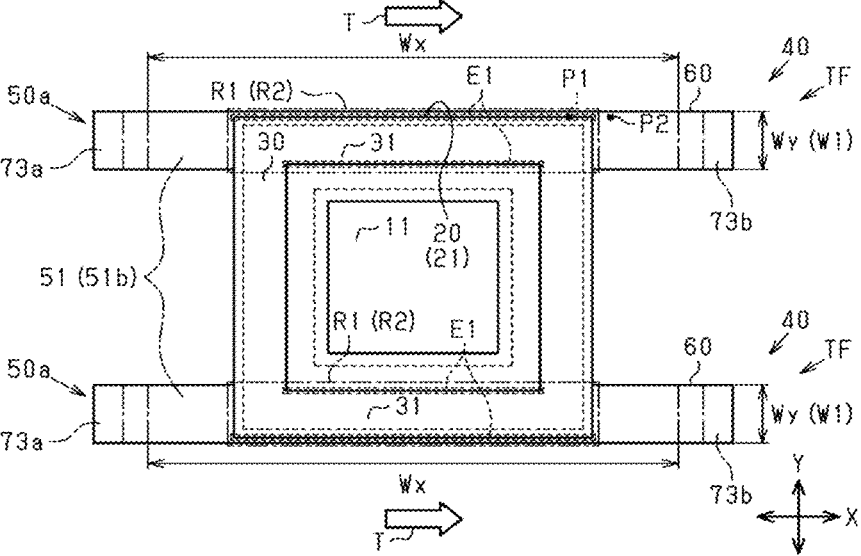
FIG. 6 is a cross-sectional view, taken along line VI-VI of FIG. 4.

As illustrated in FIGS. 4 to 6, the pressing assemblies 50a, 50b each include a pressing member 51, an insulating member 52, a shock absorption member 53, a heating member 54, and a welding suppression mechanism TF. Details of parts of each of the pressing assemblies 50a, 50b will be described below. Unless otherwise specified, the parts of the pressing assemblies 50a, 50b to be described hereinafter belong to the first pressing assembly 50a. It is noted that the parts of the second pressing assembly 50b are the same as those of the first pressing assembly 50a. Therefore, the parts of the second pressing assembly 50b are designated by the same reference numerals as those of the first pressing assembly 50a, and the description thereof may be omitted.

<Pressing Member 51>

The pressing member 51 is a seal bar that presses the resin portions 20, 30 in the pressing direction Z. The pressing member 51 of the present embodiment has a square column shape. A long side direction X of the pressing member 51 is perpendicular to the pressing direction Z. A short side direction Y of the pressing member 51 is perpendicular to both the pressing direction Z and the long side direction X. The pressing member 51 includes a connection surface 51a, a pressing surface 51b, two end surfaces 51c, and two guide portions 51d.

<Connection Surface 51a>

The connection surface 51a is a surface, of two surfaces perpendicular to the pressing direction Z, to which a tip of the cylinder rod 47 is connected. The connection surface 51a of the present embodiment has a rectangular shape perpendicular to the pressing direction Z. A long side of the connection surface 51a extends in the long side direction X. A short side of the connection surface 51a extends in the short side direction Y.

<Pressing Surface 51b>

The pressing surface 51b is a surface, of surfaces perpendicular to the pressing direction Z, located opposite from the connection surface 51a in the pressing direction Z. The pressing surface 51b of the present embodiment has a rectangular shape. A long side of the pressing surface 51b extends in the long side direction X. A short side of the pressing surface 51b extends in the short side direction Y. It can be also said that the long side direction X is a direction in which the long side of the pressing surface 51b extends. In addition, it can be also said that the short side direction Y is a direction in which the short side of the pressing surface 51b extends.

<End Surface 51c>

The two end surfaces 51c are located at the ends of the pressing member 51 in the long side direction X. The two end surfaces 51c extend from the two short sides of the pressing surface 51b in the pressing direction Z, respectively.

<Guide Portion 51d>

The guide portions 51d each are a column-shaped part extending in the pressing direction Z. The guide portions 51d of the present embodiment each have a cylindrical shape. The guide portions 51d are connected to the connection surface 51a of the pressing member 51.

The guide portions 51d are inserted through the upper base 43. When the cylinder rod 47 moves in or out relative to the cylinder body 46, the pressing member 51 of the first pressing assembly 50a moves in the pressing direction Z with the guide portions 51d inserted through the upper base 43. At this time, if the pressing member 51 moves in a direction different from the pressing direction Z, the guide portions 51d and the upper base 43 interfere with each other. Such interference restricts movement of the pressing member 51 in the direction different from the pressing direction Z. This suppresses shifting of a direction in which the first pressing assembly 50a moves from the pressing direction Z. Since the second pressing assembly 50b is fixed to the lower base 41, the second pressing assembly 50b does not have to include the guide portions 51d. The second pressing assembly 50b of the present embodiment does not include the guide portions 51d.

<Insulating Member 52>

The insulating member 52 is an insulating layer that maintains the insulation for the pressing surface 51b. The insulating member 52 covers the pressing surface 51b. The insulating member 52 of the present embodiment has a sheet shape. The insulating member 52 may be made of any suitable material such as glass fibers and ceramics. It is noted that the insulating member 52 may further cover the end surfaces 51c in order to enhance the insulating property of the pressing member 51.

<Shock Absorption Member 53>

The shock absorption member 53 is an elastic body that elastically deform easily as compared to the pressing member 51. The shock absorption member 53 covers the pressing surface 51b. In detail, the shock absorption member 53 covers the pressing surface 51b via the insulating member 52. The shock absorption member 53 is elastically deformed when the pressing member 51 is pressing the resin portions 20, 30 to suppress unevenness in the pressure applied by the pressing member 51 to the resin portions 20, 30. The shock absorption member 53 may be made of any suitable material such as natural rubber, fluorine rubber, and urethane rubber. In particular, when silicon rubber is used as a material for the shock absorption member 53, the insulation of the pressing member 51 is increased. In addition, when silicon rubber is used as a material for the shock absorption member 53, the shock absorption member 53 also functions as a slip prevention for adjacent parts such as the insulating member 52.

<Heating Member 54>

The heating member 54 heats the resin portions 20, 30. The heating member 54 of the present embodiment is provided integrally with the pressing member 51. The heating member 54 includes an electric heating sheet 55 and two heating electrodes 56.

<Electric Heating Sheet 55>

The electric heating sheet 55 is a resistor having a sheet shape. The electric heating sheet 55 has a squared U-shape. The coefficient of thermal expansion of the electric heating sheet 55 is greater than that of the shock absorption member 53. The electric heating sheet 55 covers the pressing surface 51b via the insulating member 52 and the shock absorption member 53. The electric heating sheet 55 covers the two end surfaces 51c. It is noted that the end surfaces 51c and the electric heating sheet 55 are insulated by an insulating member or the like (not illustrated).

<Heating Electrode 56>

The heating electrodes 56 are electrodes for applying an electric current to the electric heating sheet 55. Each of the two heating electrodes 56 are disposed on each of the two end surfaces 51c via the electric heating sheet 55. The heating electrodes 56 are connected to a power supply (not illustrated). Electric power from the power supply is supplied to the electric heating sheet 55 through the heating electrodes 56. As a result, the electric heating sheet 55 generates resistance heat. The heating member 54 heats the resin portions 20, 30 by using the resistance heat generated by the electric heating sheet 55.

The heating member 54 of the present embodiment heats the resin portions 20, 30 to be welded while pressing the resin portions 20, 30 toward the electrode plate 11 with the pressing member 51. The heating member 54 of the present embodiment is a so-called impulse heater. The shock absorption member 53 suppresses thermal expansion and thermal shrinkage of the electric heating sheet 55 while heat is applied by the heating member 54. In view of suppressing the thermal expansion and the thermal shrinkage of the electric heating sheet 55, silicon rubber is preferable as a material for the shock absorption member 53.

<Welding Suppression Mechanism TF>

The welding suppression mechanism TF is a mechanism to suppress welding of the resin portions 20, 30 to parts disposed on the pressing member 51 and the pressing surface 51b, and the like. The parts disposed on the pressing member 51 and the pressing surface 51b include, for example, the insulating member 52, the shock absorption member 53, and the heating member 54. The welding suppression mechanism TF includes a sheet material 60, and a moving mechanism 70.

<Sheet Material 60>

The sheet material 60 is easily peeled off from the resin portions 20, 30 as compared to the electrode plate 11. Peel strength of the sheet material 60 from the resin portions 20, 30 is smaller than that of the electrode plate 11 from the resin portions 20, 30. For example, the peel strength of the sheet material 60 from the resin portions 20, 30 is 0.5 times or less, preferably 0.1 times or less, and more preferably 0.01 times or less as small as that of the electrode plate 11 from the resin portions 20, 30. The sheet material 60 may include a fluorine compound such as polytetrafluoroethylene. The sheet material 60 of the present embodiment is a glass cloth impregnated with a fluorine compound. The glass cloth is made of glass fibers with higher thermal conductivity than fluorine compounds. Thus, using the grass cloth as the sheet material 60 allows heat to transmit from the heating member 54 to the resin portions 20, 30 suitably. It is noted that the sheet material 60 is not limited to the glass cloth, and may be a resin sheet obtained by forming a resin made of the above-mentioned fluorine-based compound into a sheet shape, for example.

The sheet material 60 of the present embodiment has a band shape extending in a predetermined longitudinal direction. The longitudinal direction is perpendicular to a width direction of the sheet material 60. A width W1 of the sheet material 60 is equal to or greater than a length Wy of the short side of the pressing surface 51b. In the present embodiment, the width W1 of the sheet material 60 is equal to the length Wy of the short side of the pressing surface 51b.

<Moving Mechanism 70>

The moving mechanism 70 has an unwinder 71, an unwinding controller 72, a pair of support members 73a, 73b, a winding controller 74, and a winder 75. The moving mechanism 70 supports the sheet material 60, which forms a sheet moving path L1 on which the sheet material 60 moves. The sheet moving path L1 is a path along which the sheet material 60 supplied from the unwinder 71 moves. The sheet material 60 supplied from the unwinder 71 moves along the sheet moving path L1 in order of the unwinding controller 72, the support members 73a, 73b, the winding controller 74, and the winder 75.

<Unwinder 71>

The unwinder 71 is a reel rotatable around a rotation axis parallel to the short side direction Y. The sheet material 60 is wound around the unwinder 71. Accordingly, the unwinder 71 supports one end of the sheet material 60 in the longitudinal direction thereof. The unwinder 71 is a source from which the sheet material 60 is supplied to the sheet moving path L1. The unwinder 71 is positioned on an upstream end of the sheet moving path L1.

The unwinder 71 is disposed away from the pressing member 51 in the pressing direction Z. The unwinder 71 is disposed parallel to the pressing direction Z and away from the pressing surface 51b in a direction extending from the pressing surface 51b toward the connection surface 51a. Specifically, the upper base 43 is interposed between the unwinder 71 and the pressing member 51 of the first pressing assembly 50a. The lower base 41 is interposed between the unwinder 71 and the pressing member 51 of the second pressing assembly 50b.

<Unwinding Controller 72>

The unwinding controller 72 controls a conveyance amount of the sheet material 60 supplied from the unwinder 71. The conveyance amount of the sheet material 60 can be expressed by, for example, the length, volume, and moving distance conveyed in the longitudinal direction of the sheet material 60. For the sake of description, a length of the sheet material 60 in the longitudinal direction is simply called as the length of the sheet material 60. The unwinding controller 72 includes a first unwinding guide roller 72a, a second unwinding guide roller 72b, and an unwinding dancer roller 72c. The first unwinding guide roller 72a, the second unwinding guide roller 72b, and the unwinding dancer roller 72c each are rotatable around their respective rotation axes parallel to the short side direction Y.

<Unwinding Guide Rollers 72a, 72b>

Both of the first unwinding guide roller 72a and the second unwinding guide roller 72b are disposed away from the unwinder 71 in the long side direction X. The first unwinding guide roller 72a is positioned between the second unwinding guide roller 72b and the unwinder 71.

<Unwinding Dancer Roller 72c>

The unwinding dancer roller 72c is disposed away, in the pressing direction Z, from a midpoint between the first unwinding guide roller 72a and the second unwinding guide roller 72b in the long side direction X. The unwinding dancer roller 72c is positioned closer to the pressing member 51 in the pressing direction Z than the first unwinding guide roller 72a and the second unwinding guide roller 72b are. The unwinding dancer roller 72c is configured to be movable at least in the pressing direction Z. In the present embodiment, the unwinding dancer roller 72c is configured to be movable in the pressing direction Z. As a result, the distance of the unwinding dancer roller 72c relative to the first unwinding guide roller 72a and the second unwinding guide roller 72b in the pressing direction Z may be adjusted. The unwinding dancer roller 72c is configured to adjust the tension of the sheet material 60 supported by the support members 73a, 73b, which will be described later.

The sheet material 60 supplied from the unwinder 71 is conveyed to the first unwinding guide roller 72a, the unwinding dancer roller 72c, and the second unwinding guide roller 72b in the unwinding controller 72 in this order. With the movement of the unwinding dancer roller 72c in the pressing direction Z, the lengths of the sheet material 60 from the unwinding dancer roller 72c to the unwinding guide rollers 72a, 72b and the conveyance amount of the sheet material 60 from the unwinding controller 72 are controlled.

<Support Members 73a, 73b>

The support members 73a, 73b are spaced in the long side direction X. The support members 73a, 73b lay the sheet material 60 across in the long side direction X. As a result, the sheet material 60 is supported by the support members 73a, 73b so as to be positioned between the pressing member 51 and the resin portions 20, 30. In other words, the support members 73a, 73b support the sheet material 60 so that the sheet material 60 is positioned between the pressing member 51 and the resin portions 20, 30. In the present embodiment, the support members 73a, 73b support the sheet material 60 so that the sheet material 60 is placed in contact with the pressing surface 51b. A state in which the sheet material 60 is in contact with the pressing surface 51b is not limited to a state in which the sheet material 60 is in direct contact with the pressing surface 51b, but includes a state in which the sheet material 60 is indirectly in contact with the pressing surface 51b via other parts such as the insulating member 52, the shock absorption member 53, and the heating member 54. It is noted that the sheet material 60 is not fixed to the pressing surface 51b even when the sheet material 60 is in contact with the pressing surface 51b. That is, the sheet material 60 is movable relative to the pressing surface 51b.

The support members 73a, 73b of the present embodiment each are a guide roller. The support members 73a, 73b are rotatable around their respective rotation axes parallel to the short side direction Y. The support members 73a, 73b of the first pressing assembly 50a are configured to be movable in the pressing direction Z with the operation of the cylinder unit 45, e.g., moving-in or -out of the cylinder rod 47. For the sake of description, the support members 73a, 73b are referred to as the first support member 73a and the second support member 73b.

<First Support Member 73a>

The first support member 73a is disposed away from the second unwinding guide roller 72b in the pressing direction Z. The first support member 73a is disposed away from the pressing member 51 in the long side direction X. At least part of the first support member 73a faces one of the end surfaces 51c in the long side direction X.

<Second Support Member 73b>

The second support member 73b is disposed away from the first support member 73a in the long side direction X. In a plan view in the pressing direction Z, the pressing member 51, specifically, the pressing surface 51b, is disposed between the first support member 73a and the second support member 73b. At least part of the second support member 73b faces one of the end surfaces 51c in the long side direction X. The one of the end surfaces 51c facing the second support member 73b is positioned opposite from the end surface 51c facing the first support member 73a in the long side direction X.

The sheet material 60 conveyed from the second unwinding guide roller 72b is conveyed to the first support member 73a and the second support member 73b in this order. At this time, the first support member 73a and the second support member 73b support the sheet material 60 on the pressing surface 51b. In other words, the pressing surface 51b is covered in the pressing direction Z by the sheet material 60 that is supported by the first support member 73a and the second support member 73b. As a result, the pressing surface 51b faces the resin portions 20, 30 in the pressing direction Z via the sheet material 60 supported by the support members 73a, 73b. This allows the pressing member 51 to press the resin portions 20, 30 via the sheet material 60 supported by the support members 73a, 73b.

<Winding Controller 74>

The winding controller 74 controls the conveyance amount of the sheet material 60 downstream of the support members 73a, 73b in the sheet moving path L1. The winding controller 74 includes a first winding guide roller 74a, a second winding guide roller 74b, and a winding dancer roller 74c. The first winding guide roller 74a, the second winding guide roller 74b, and the winding dancer roller 74c each are rotatable around their respective rotation axes parallel to the short side direction Y.

<Winding Guide Rollers 74a, 74b>

Both of the first winding guide roller 74a and the second winding guide roller 74b are disposed away from the winder 75 in the long side direction X. The second winding guide roller 74b is positioned between the first winding guide roller 74a and the winder 75.

<Winding Dancer Roller 74c>

The winding dancer roller 74c is disposed away, in the pressing direction Z, from a midpoint between the first winding guide roller 74a and the second winding guide roller 74b in the long side direction X. The winding dancer roller 74c is positioned closer to the pressing member 51 in the pressing direction Z than the first winding guide roller 74a and the second winding guide roller 74b are. The winding dancer roller 74c is configured to be movable at least in the pressing direction Z. In the present embodiment, the winding dancer roller 74c is configured to be movable in the pressing direction Z. As a result, the distance of the winding dancer roller 74c relative to the first winding guide roller 74a and the second winding guide roller 74b in the pressing direction Z may be adjusted. The winding dancer roller 74c is configured to adjust the tension of the sheet material 60 supported by the support members 73a, 73b.

The sheet material 60 from the second support member 73b is conveyed to the first winding guide roller 74a, the winding dancer roller 74c, and the second winding guide roller 74b in this order in the winding controller 74. With the movement of the winding dancer roller 74c in the pressing direction Z, the lengths of the sheet material 60 between the winding dancer roller 74c and the winding guide rollers 74a, 74b and the conveyance amount of the sheet material 60 from the winding controller 74 are controlled.

<Winder 75>

The winder 75 is a reel rotatable around a rotation axis parallel to the short side direction Y. The winder 75 winds the sheet material 60 supplied from the unwinder 71 along the sheet moving path L1. Specifically, the winder 75 winds the sheet material 60 supplied from the winding controller 74. The winder 75 supports one end of the sheet material 60 in the longitudinal direction thereof by winding the sheet material 60. The winder 75 is a destination to which the sheet material 60 is conveyed from the sheet moving path L1. The winder 75 is positioned on a downstream end of the sheet moving path L1.

The winder 75 is disposed away from the pressing member 51 in the pressing direction Z. The winder 75 is disposed parallel to the pressing direction Z and away from the pressing surface 51b in a direction extending from the pressing surface 51b toward the connection surface 51a. Specifically, the upper base 43 is interposed between the winder 75 of the first pressing assembly 50a and the pressing member 51. The lower base 41 is interposed between the winder 75 of the second pressing assembly 50b and the pressing member 51. The winder 75 is spaced from the unwinder 71 in the long side direction X.

<Moving Direction T of Sheet Material 60>

In the welding suppression mechanism TF configured in this manner, the sheet material 60 supplied from the unwinder 71 passes through the unwinding controller 72, the first support member 73*a*, the second support member 73*b*, the winding controller 74 in this order, and is conveyed to the winder 75. At this time, the moving mechanism 70 slides the sheet material 60 supported by the support members 73*a*, 73*b* in a moving direction T. The moving direction T is a direction in which the sheet material 60 supported by the support members 73*a*, 73*b* slides. Specifically, the moving direction T is the direction from the first support member 73*a* to the second support member 73*b*.

"Sliding" indicates moving the sheet material 60 supported by the support members 73*a*, 73*b* while the sheet material 60 is kept being supported by the support members 73*a*, 73*b* in a direction intersecting the pressing direction Z relative to the pressing surface 51*b*. Sliding the sheet material 60 includes sliding the sheet material 60 against the pressing surface 51*b*. In addition, when the support members 73*a*, 73*b* support the sheet material 60 at a position away from the pressing surface 51*b* in the pressing direction Z, sliding the sheet material 60 includes moving the sheet material 60 in the moving direction T while the sheet material 60 is supported away from the pressing surface 51*b*.

As described above, the first support member 73*a* and the second support member 73*b* are spaced in the long side direction X. Therefore, the moving direction T in the present embodiment is parallel to the long side direction X. In other words, the pair of support members 73*a*, 73*b* is disposed away from each other in the moving direction T. Since the long side direction X is perpendicular to the pressing direction Z, the moving direction T intersects the pressing direction Z.

It is noted that a distance between the first support member 73*a* and the second support member 73*b* in the moving direction T is greater than a length of the pressing surface 51*b* in the moving direction T (the length Wx of the long side of the pressing surface 51*b* in the present embodiment). Therefore, the length of the sheet material 60 supported by the support members 73*a*, 73*b* in the moving direction T is greater than the length of the pressing surface 51*b* in the moving direction T. The length of the pressing surface 51*b* in the moving direction T is greater than the length of the resin edge portions 21, 31 in the moving direction T. Therefore, the length of the sheet material 60 supported by the support members 73*a*, 73*b* in the moving direction T is greater than the length of the pressing surface 51*b* in the moving direction T. That is, the sheet material 60 is formed in a so-called long shape, which is longer than the resin portions 20, 30 in the moving direction T.

<Positional Relationship Between Pressing Assemblies 50*a*, 50*b*>

The pressing member 51 of the first pressing assembly 50*a* and the pressing member 51 of the second pressing assembly 50*b* configured in this way face each other in the pressing direction Z with the respective sheet materials 60 supported by their associated supporting members 73*a*, 73*b* interposed therebetween. A region of the sheet material 60 supported by the support members 73*a*, 73*b* of the first pressing assembly 50*a* and a region of the sheet material 60 supported by the support members 73*a*, 73*b* of the second pressing assembly 50*b* are spaced in the pressing direction Z and face each other. The electrode plate 11 having the resin portions 20, 30 may be disposed between the region of the sheet material 60 supported by the support members 73*a*, 73*b* of the first pressing assembly 50*a* and the region of the sheet material 60 supported by the support members 73*a*, 73*b* of the second pressing assembly 50*b*.

<Control Circuit 90>

The control circuit 90 includes a processor, and a memory. For example, a CPU (Central Processing Unit), a GPU (Graphics Processing Unit), or a DSP (Digital Signal Processor) are used as the processor. The memory includes a RAM (Random Access Memory) and a ROM (Read Only Memory). The memory stores program codes or instructions configured to cause the processor to execute processing. The memory, i.e., the computer-readable medium, includes any available medium accessible by a general-purpose or dedicated computer. The control circuit 90 may include a hardware circuit such as an ASIC (Application Specific Integrated Circuit) or an FPGA (Field Programmable Gate Array). The control circuit 90, which is a processing circuit, may include one or more processors operating in accordance with computer programs, one or more hardware circuits such as ASICs and FPGAs, or a combination thereof.

The control circuit 90 controls moving-in or -out of the cylinder rod 47 relative to the cylinder body 46. Along with the moving-in or -out of the cylinder rod 47, the pressing member 51 of the first pressing assembly 50*a* moves in the pressing direction Z. This changes the distance between the pressing member 51 of the first pressing assembly 50*a* and the pressing member 51 of the second pressing assembly 50*b* in the pressing direction Z. When the electrode plate 11 and the resin portions 20, 30 are disposed between the pressing member 51 of the first pressing assembly 50*a* and the pressing member 51 of the second pressing assembly 50*b*, both of the pressing members 51 of the pressing assemblies 50*a*, 50*b* press the resin portions 20, 30 against the electrode plate 11.

The control circuit 90 causes the heating member 54 to generate heat by controlling power supplied from the power supply to the heating member 54. The control circuit 90 heats the resin portions 20, 30 using the heating member 54.

The control circuit 90 obtains a pressure value at which the pressing member 51 presses the resin portions 20, 30. The pressure value only has to be obtained from a measurement by a pressure sensor (not illustrated). In addition, the control circuit 90 obtains a temperature of the heating member 54. The temperature of the heating member 54 only has to be obtained by a measurement by a temperature sensor (not illustrated). The control circuit 90 controls the cylinder unit 45 and the power supply so that the obtained pressure value and temperature become their respective predetermined target values.

The control circuit 90 causes the sheet material 60 to slide in the moving direction T by controlling the moving mechanism 70. In the present embodiment, the control circuit 90 controls the unwinder 71, the unwinding controller 72, the winding controller 74, and the winder 75. The control circuit 90 controls the conveyance amount of the sheet material 60 from the unwinder 71 to the unwinding controller 72 by controlling the amount of rotation of the unwinder 71. The control circuit 90 controls the conveyance amount of the sheet material 60 to the support members 73*a*, 73*b* by controlling the position of the unwinding controller 72, more specifically, controlling a position of the unwinding dancer roller 72*c* in the pressing direction Z. The control circuit 90 controls the conveyance amount of the sheet material 60 to the winder 75 by controlling the position of the winding controller 74, more specifically, controlling a position of the winding dancer roller 74*c* in the pressing direction Z. By controlling the welding suppression mechanism TF in this way, the control circuit 90 causes the sheet material 60 supported by the support members 73a, 73b to slide in the moving direction T (the long side direction X in the present embodiment). Thus, the unwinder 71, the unwinding controller 72, the support members 73a, 73b, the winding controller 74, and the winder 75 included in the moving mechanism 70 have a function to cause the sheet material 60 supported by the support members 73a, 73b to slide in the moving direction T.

<Method for Manufacturing Electrode Unit 10>

Next, a method for manufacturing the electrode unit 10 as a resin welded workpiece using the welding device 40 will be described with reference to FIGS. 5 to 7. In the present embodiment, two welding devices 40 are used to manufacture the electrode unit 10. The long side directions X of the two welding devices 40 are parallel. The short side directions Y of the two welding devices are parallel. The pressing directions Z X of the two welding devices 40 are parallel. The two welding devices 40 are spaced in the short side direction Y.

<Initialization Process S1>

Figure 7:
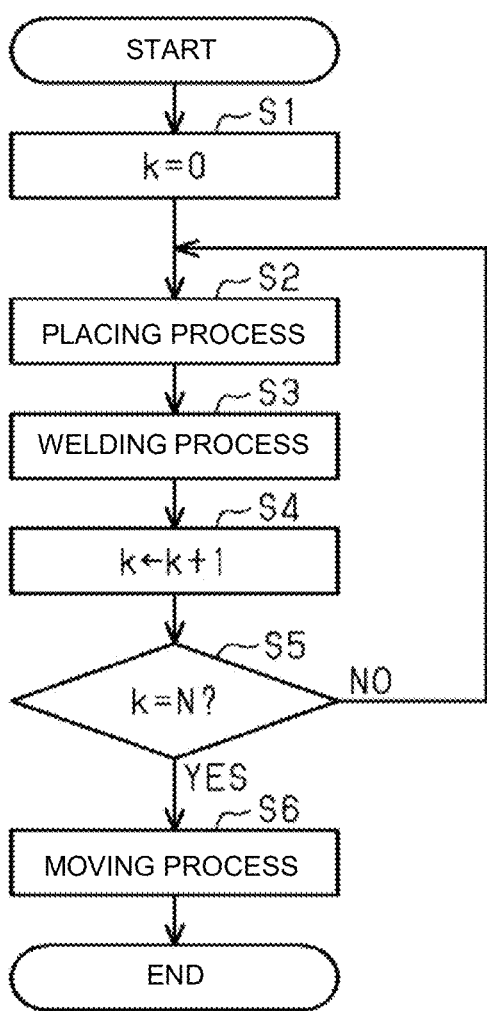
FIG. 7 is a flowchart showing an example of method for manufacturing an electrode unit.

As shown in FIG. 7, the control circuit 90 sets a variable k to 0 in the initialization process S1. The variable k is an integer equal to or greater than 0.

<Placing Process S2>

Next, it proceeds to the placing process S2. In the placing process S2, the electrode plates 11 and the resin portions 20, 30 are placed between the first pressing assembly 50a and the second pressing assembly 50b. In the present embodiment, the resin edge portions 21, 31 are placed along the edges 12a. Placing the resin portions 20, 30 to the electrode plate 11 may be accomplished in advance, for example, by pressure-bonding or by welding parts of the resin portions 20, 30 to the electrode plate 11 in a welding process S3, which will be described later. The parts of the resin portions 20, 30 are, for example, two first resin edge portions 21 facing each other and two second resin edge portions 31 facing each other. At this time, the two first resin edge portions 21 facing each other face their corresponding pressing members 51 of the first pressing assemblies 50a of the different welding devices 40 in the pressing direction Z. Similarly, the two second resin edge portions 31 facing each other face their corresponding pressing members 51 of the second pressing assemblies 50b of the different welding devices 40 in the pressing direction Z. The electrode plate 11 is placed between the first pressing assembly 50a and the second pressing assembly 50b by, for example, a robot hand (not illustrated).

<Welding Process S3>

Next, it proceeds to the welding process S3. In the welding process S3, the control circuit 90 causes the two welding devices 40 to weld the resin portions 20, to the electrode plate 11 to manufacture the electrode unit 10. In the present embodiment, the resin edge portions 21, 31 placed between the pressing assemblies 50a, 50b in the placing process S2 are welded to the electrode plate 11.

Here, an example of processing of the control circuit 90 in the welding process S3 will be described. Firstly, the control circuit 90 causes the pressing member 51 to be in contact with the resin portions 20, 30 via the sheet material 60. Specifically, the control circuit 90 causes the cylinder rod 47 of the cylinder unit 45 to project from the cylinder body 46 in the pressing direction Z to move the pressing member 51 in the pressing direction Z. With the movement of the pressing member 51 in the pressing direction Z, the pressing surface 51b of the first pressing assembly 50a and the pressing surface 51b of the second pressing assembly 50b are placed in contact with the resin edge portions 21, 31.

Next, the control circuit 90 causes the heating member 54 to heat the resin edge portions 21, 31 which are pressed by the pressing member 51. The resin edge portions 21, 31 are melted by the heating.

The control circuit 90 causes the pressing member 51 to press the melted resin portions 20, 30 via the sheet material 60. Specifically, the control circuit 90 causes the cylinder rod 47 to projects from the cylinder body 46 in the pressing direction Z to press the resin edge portions 21, 31 against the pressing surface 51b via the sheet material 60.

At this time, as illustrated in FIG. 6, the pressing surface 51b presses a resin pressing region R1 in the resin portions 20, 30 via the sheet material 60. The resin pressing region R1 is a region of the resin portions 20, 30 that is pressed by the pressing surface 51b presses via the sheet material 60. In the present embodiment, the resin pressing region R1 has a rectangular shape. In addition, the resin pressing region R1 includes end edges E1 that extend along the long side of the resin pressing region R1. The end edges E1 form part of an outer edge of the resin pressing region R1. The end edges E1 are the end edges extending in the long side direction X of the resin edge portions 21, 31. The direction in which the end edges E1 extend is parallel to the long side direction X. Therefore, the direction in which the end edges E1 extend also corresponds to the long side direction X.

When the pressing member 51 presses the sheet material 60, the sheet pressing region R2 is defined in the sheet material 60. The sheet pressing region R2 is a region of the sheet material 60 that is pressed by the pressing member 51 in the welding process S3. In the plan view from the pressing direction Z, the sheet pressing region R2 overlaps the pressing surface 51b. In the present embodiment, the sheet pressing region R2 has a rectangular shape. In the plan view in the pressing direction Z, the sheet pressing region R2 includes the resin pressing region R1. The sheet pressing region R2 is a region positioned between the two pressing surfaces 51b facing each other in the pressing direction Z in the sheet material 60, that is, between the pressing surface 51b of the first pressing assembly 50a and the pressing surface 51b of the second pressing assembly 50b.

Then, the control circuit 90 causes the heating member 54 to stop heating to cool the resin edge portions 21, 31. The resin portions 20, 30 are solidified by the cooling. Thus, the resin portions 20, 30 are welded to the electrode plate 11. At this time, a portion of the resin edge portions 21, 31, in particular, the resin pressing region R1 may be welded to the region of the sheet material 60 supported by the support members 73a, 73b, in particular, a region included in the sheet pressing region R2.

Next, the control circuit 90 causes the pressing member 51 to stop pressing the resin portions 20, 30. Specifically, the control circuit 90 causes the cylinder rod 47 to be accommodated in the cylinder body 46. Thus, the pressing member 51 moves away from the resin portions 20, 30 in the pressing direction Z and stops pressing of the resin portions 20, 30. At this time, the region of the sheet material 60 supported by the support members 73a, 73b is peeled from the resin edge portions 21, 31.

It is noted that when there are resin edge portions 21, 31 that are not welded at this stage, the control circuit 90 may perform the same process for the resin edge portions 21, 31 to weld the resin edge portions 21, 31 that are not welded. Alternatively, the control circuit 90 may cause two welding devices 40 separately provided from the two welding devices 40 having performed welding in the above welding process S3 to perform the same process for the electrode plate 11 to which the resin portions 20, 30 are partially welded, thereby welding the resin edge portions 21, 31 that are not welded. The electrode unit 10 is manufactured by welding all the resin edge portions 21, 31 to the electrode plate 11 in this way. In other words, the electrode unit 10 is manufactured by welding all the resin portions 20, 30 to the electrode plate 11. The manufactured electrode unit 10 is removed from the welding device 40 by a robotic hand or the like.

It is noted that a stacking process (not shown) is performed when the number of electrode units 10 manufactured in the welding process S3 reaches a predetermined number. In the stacking process, a plurality of electrode units 10 manufactured in the welding process S3 are stacked in the thickness direction of the electrode plate 11 to manufacture the power storage module B.

<Counting-Up Process S4>

As shown in FIG. 7, after the welding process S3 ends, it proceeds to a counting-up process S4. In the counting-up process S4, the control circuit 90 increases a value of the variable k by 1.

<Moving Determination Process S5>

Next, it proceeds to the moving determination process S5. In the moving determination process S5, the control circuit 90 determines whether or not the welding process S3 has been performed a predetermined number of times. In the present embodiment, the control circuit 90 determines whether the variable k matches a determination value N. In other words, the predetermined number of times in the moving determination process S5 is the number of times indicated by the determination value N. For the determination value N, any integer equal to or greater than 1 may be set. The determination value N may be set to any suitable value as long as it is equal to or less than the durable number of times of the sheet material 60, for example. For example, assuming that the sheet material 60 can be peeled from the resin portions 20, 30 after the welding process S3 as one peeling action, the durable number of times of the sheet material 60 corresponds to the number of times that this one peeling action can be performed. The determination value N is included in a range of, for example, 0.001 to 1 time, preferably 0.005 to 0.5 times, and more preferably 0.01 to 0.1 times, of the durable number of times.

It is noted that determination method is not limited to this, but any suitable method may be employed as the determination method in the moving determination process S5. For example, whether or not the sheet material 60 is to be slid may be determined based on the degree of deterioration of the sheet material 60.

As one cause of the deterioration of the sheet material 60, interference of a machining mark of the electrode plate 11, e.g., a burr of the edges 12a with the sheet material 60 in pressing the resin portions 20, 30 may be considered. The burr of the edges 12a is produced, for example, by cutting a base material of the electrode plate 11 with a die cutter or the like when the electrode plate 11 is manufactured. Such deterioration due to the machining mark of the electrode plate 11 occurs in the long side direction X in which the resin edge portions 21, 31 to be pressed by the pressing member 51 extend.

In addition, as another cause of the deterioration of the sheet material 60, a portion of the melted resin portions 20, 30 remaining in the sheet material 60 can be considered. If a portion of the melted resin portions 20, 30 remains in the sheet material 60, the peel strength of the sheet material 60 from the resin portions 20, 30 is increased. In other words, the sheet material 60 is more likely to be weld to the resin portions 20, 30. Especially, a region of the sheet material 60 in contact with the end edge E1 of the resin pressing region R1 in welding is particularly prone to deterioration as compared to the other regions of the sheet material 60.

Such deterioration of the sheet material 60 progresses each time the welding process S3 is performed. The degree of the deterioration of the sheet material 60 may be determined based on a ratio of the area of the sheet material 60 to which the resin portions 20, 30 are attached to the total area of the sheet material 60 supported by the support members 73a, 73b. In addition, the degree of the deterioration of the sheet material 60 may be determined based on the fluffiness of the glass fibers in the pressing direction Z from the sheet material 60 supported by the support members 73a, 73b. Such determination may be performed, for example, by visual inspection or image recognition. The determination value N only has to be set based on the degree of the deterioration of the sheet material 60 determined by these methods. It is noted that the determination value N may be a variable value set according to the degree of the deterioration of the sheet material 60.

<Moving Process S6>

On the other hand, if a result of determination in the moving determination process S5 is positive, i.e., if the variable k has reached the determination value N, it proceeds to the moving process S6. The result of determination in the moving determination process S5 being positive corresponds to a case where the welding process S3 is performed a predetermined number of times. Therefore, the moving process S6 is performed when the welding process S3 is performed once or more. It can be also said that the moving process S6 is a process performed after the welding process S3.

In the moving process S6, the control circuit 90 controls the unwinder 71 so that the sheet material 60 is supplied from the unwinder 71 to the unwinding controller 72. With supply of the sheet material 60 from the unwinder 71, the control circuit 90 controls the unwinding controller 72 and the winding controller 74 so that the sheet material 60 supported by the support members 73a, 73b slides in the moving direction T (the long side direction X in the present embodiment). Specifically, the control circuit 90 causes the sheet material 60 to be supplied from the unwinder 71 and brings the unwinding dancer roller 72c close to the first unwinding guide roller 72a and the second unwinding guide roller 72b. Thus, the sheet material 60 is supplied from the unwinder 71 and the unwinding controller 72 to the support members 73a, 73b. Accordingly, at least a portion of the sheet material 60 supported by the support members 73a, 73b is supplied to the winding controller 74. As a result, the sheet material 60 supported by the support members 73a, 73b slides in the moving direction T (long side direction X). Specifically, as illustrated in FIG. 6, a first point P1 in the sheet material 60 slides to a second point P2. The first point P1 is a point of the sheet material 60 that is in contact with the resin pressing region R1 of the resin portions 20, 30, in particular, the end edge E1, in the welding process S3 before the moving process S6. The first point P1 faces the resin portions 20, 30 in the pressing direction Z. That is, the first point P1 is included in the sheet pressing region R2. The second point P2 represents a position of the first point P1 after sliding in the moving process S6. The second point P2 does not face the resin portions 20, 30 in the pressing direction Z. That is, the second point P2 is not included in the sheet pressing region R2. Therefore, a part of the region of the sheet material 60 that is in contact with the end edge E1 of the resin pressing region R1 in the previous welding process S3 is not in contact with the resin portions 20, 30 in the next welding process S3. Therefore, a part of the region of the sheet material 60 that is not in contact with the end edge E1 of the resin pressing region R1 in the previous welding process S3 is in contact with the resin portions 20, 30 in the next welding process S3. In this way, the region of the sheet material 60 in contact 20) with the resin portions 20, 30 is at least partially changed in the moving process S6 from the welding process S3. The moving distance of the sheet material 60 in the moving process S6 is equal to or greater than a length obtained by multiplying the length of the resin edge portions 21, 31 in the moving direction T by a predetermined coefficient. Such a coefficient is greater than 0 and equal to or less than 1. Such a coefficient is, for example, a value obtained by dividing the determination value N by the durable number of times. As a result, the moving distance of the sheet material 60 in one moving process S6 may be reduced while performing the welding process S3 more than the durable number of times of the sheet material 60 on a region of the sheet material 60 is suppressed. By reducing the moving distance of the sheet material 60 in one moving process S6, the time required for the one moving process S6 becomes shorter.

In addition, in the moving process S6, the control circuit 90 causes the winding dancer roller 74c to move away from the first winding guide roller 74a and the second winding guide roller 74b according to the moving amount of the unwinding dancer roller 72c. As a result, the sheet material 60 supplied from the support members 73a, 73b to the winding controller 74 is stored in the winding control unit 74. Therefore, the sheet material 60 may slide while the tension of the sheet material 60 supported by the support members 73a, 73b is maintained. The control circuit 90 causes the winder 75 to wind the sheet material 60 stored in the winding controller 74.

After the moving process S6 is performed, subsequent manufacture of the electrode unit 10 is repeated from the initialization process S1. Thus, in the subsequent manufacture of the electrode unit 10, every time the moving process S6 is performed, the sheet material 60 is sent from the unwinder 71 to the winder 75. As a result, in the moving process S6, the sheet material 60 slides in the moving direction T as appropriate. According to this, the moving mechanism 70 slides a region of the sheet material 60 that is different from the sheet pressing region R2 in the moving direction T in the welding process S3 before the moving process S6 to a position that can be pressed in the welding process S3 after the moving process S6.

It is noted that the moving distance of the sheet material 60 only has to be set appropriately according to the material and shape of the resin portions 20, 30, the material and the shape of the sheet material 60, and specific mode of the welding process S3.

Operation of First Embodiment

The following will describe an operation of the present embodiment.

The pressing member 51 presses the melted resin portions 20, 30 against the electrode plate 11 in the welding process S3, so that the resin portions 20, 30 are welded to the electrode plate 11. At this time, the pressing member 51 presses the resin portions 20, 30 against the electrode plate 11 via the sheet material 60.

Here, in the moving process S6, the control circuit 90 causes the sheet material 60 to move in the moving direction T by controlling the unwinder 71, the unwinding controller 72, the winding controller 74, and the winder 75 included in the moving mechanism 70. As a result, the region of the sheet material 60 that is different from the region of the sheet material 60 in contact with the resin portions 20, 30 pressed in the previous welding process S3 is placed between the pressing member 51 and the resin portions 20, 30.

After the moving process S6 is performed, the method for manufacturing the electrode unit 10 is repeated from the initialization process S1.

Effects of First Embodiment

The following will describe effects of the present embodiment.

(1-1) The welding device 40 welds the resin portions 20, 30 to the electrode plate 11 as a workpiece. The welding device 40 includes the pressing member 51, the pair of support members 73a, 73b, and the moving mechanism 70. The support members 73a, 73b are spaced in the moving direction T. The support members 73a, 73b supports the sheet material 60 so that the sheet material 60 covers the pressing surface 51b in the pressing direction Z. The moving mechanism 70 slides the sheet material 60 supported by the support members 73a, 73b in the moving direction T.

According to this, the pressing member 51 presses the melted resin portions 20, 30 against the workpiece. As a result, the resin portions 20, 30 are welded to the electrode plate 11. At this time, the pressing member 51 presses the resin portions 20, 30 against the electrode plate 11 via the sheet material 60. The sheet material 60 is placed in contact with the resin portions 20, 30 instead of the pressing surface 51b, so that welding of the resin portions 20, 30 to the pressing surface 51b is suppressed.

In this configuration, when the deterioration of the sheet material 60 progresses, the moving mechanism 70 slides the sheet material 60 in the moving direction T with the sheet material 60 supported by the support members 73a, 73b. By sliding the sheet material 60, the region of the sheet material 60 that is different from the region of the sheet material 60 in contact with the resin portions 20, 30 by previous pressing of the pressing member 51 may be disposed between the pressing surface 51b and the resin portions 20, 30. In other words, the time and effort for releasing the sheet material 60 and the pressing member 51 that are in a fixed state for changing the region of the sheet material 60 where deterioration progresses, as in a case where the sheet material 60 and the pressing member 51 are fixed, may be omitted. As a result, the sheet material 60 disposed between the pressing member 51 and the resin portions 20, 30 may be changed easily in a shorter time. Thus, the operation efficiency of the welding device 40 may be increased.

(1-2) The method for manufacturing the electrode unit 10 as a resin welded workpiece includes the moving process S6. In the moving process S6, the sheet material 60 is slid in the moving direction T (long side direction X) when the welding process S3 is performed once or more.

In this configuration, in the moving process S6, a region of the sheet material 60 different from the sheet pressing region R2 in the welding process S3 before the moving process S6 in the moving direction T is slid to a position that can be pressed in the welding process S3 after the moving process S6.

As the sheet material 60 slides by the moving process S6, the region of the sheet material 60 different from the sheet pressing region R2 in the welding process S3 prior to the moving process S6, that is, the region of the sheet material

60 different from the region of the sheet material 60 in contact with the resin portions 20, 30 in the welding process S3 is placed in contact with the resin portions 20, 30 in the welding process S3 after the moving process S6. Therefore, for example, the time and effort for releasing the sheet material 60 and the pressing member 51 that are in a fixed state required for changing the region of the sheet material 60 where deterioration progresses, as in a case where the sheet material 60 is fixed to the pressing member 51 that presses the electrode plate 11, may be omitted. As a result, the sheet material 60 can be changed in a shorter time. Therefore, efficiency in manufacturing the electrode unit 10 can be improved.

Configuration of Second Embodiment

Next, a welding device and a method for manufacturing an electrode unit using the welding device according to a second embodiment will be described. For the sake of description, parts of the second embodiment the same as those of the first embodiment are designated by the same reference numerals and the description thereof are omitted, and parts different from those of the first embodiment will be described.

Figure 8:
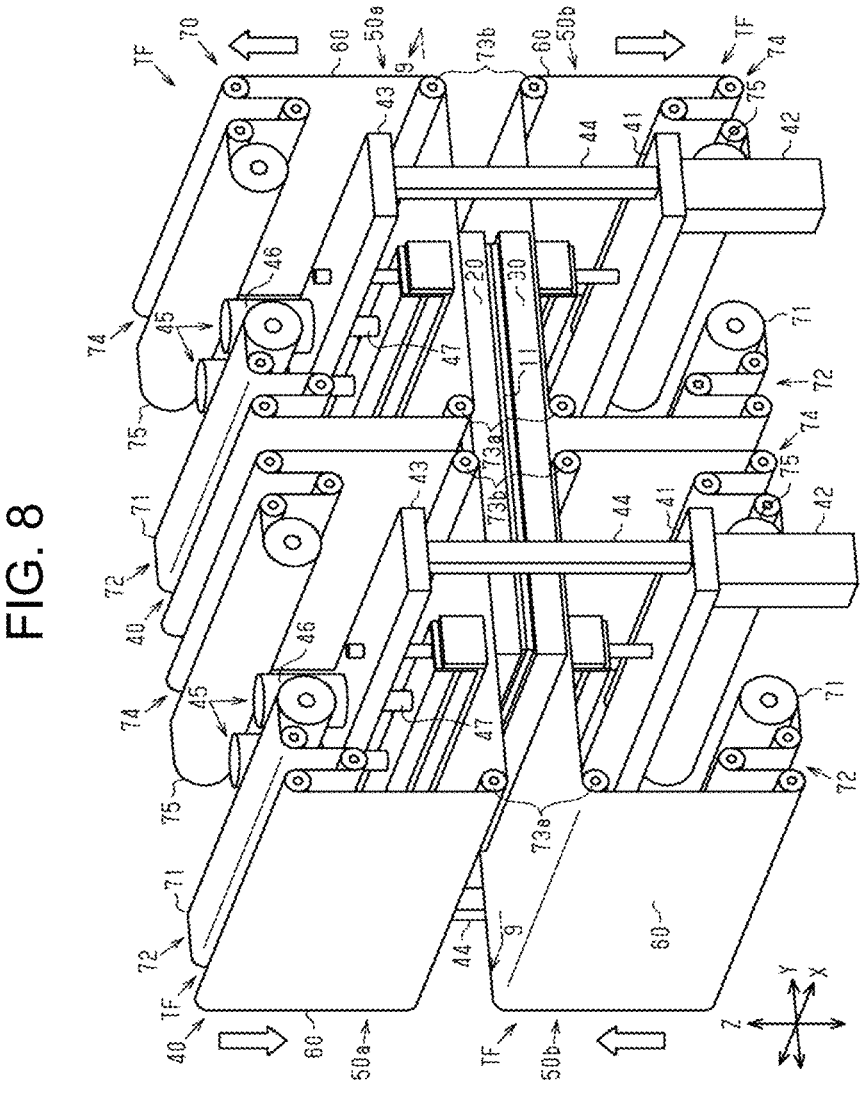
FIG. 8 is an overall perspective view of a welding device according to a second embodiment.
Figure 9:
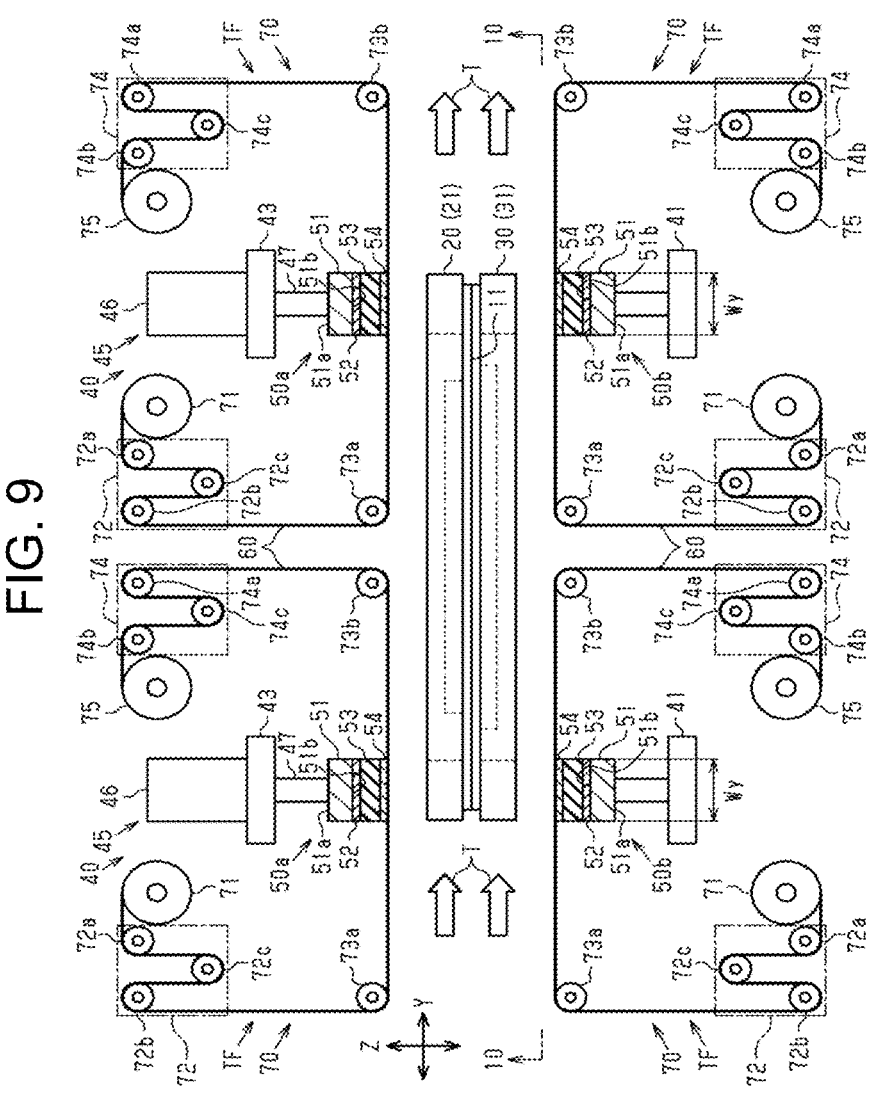
FIG. 9 is a cross-sectional view, taken along line IX-IX of FIG. 8.
Figure 10:
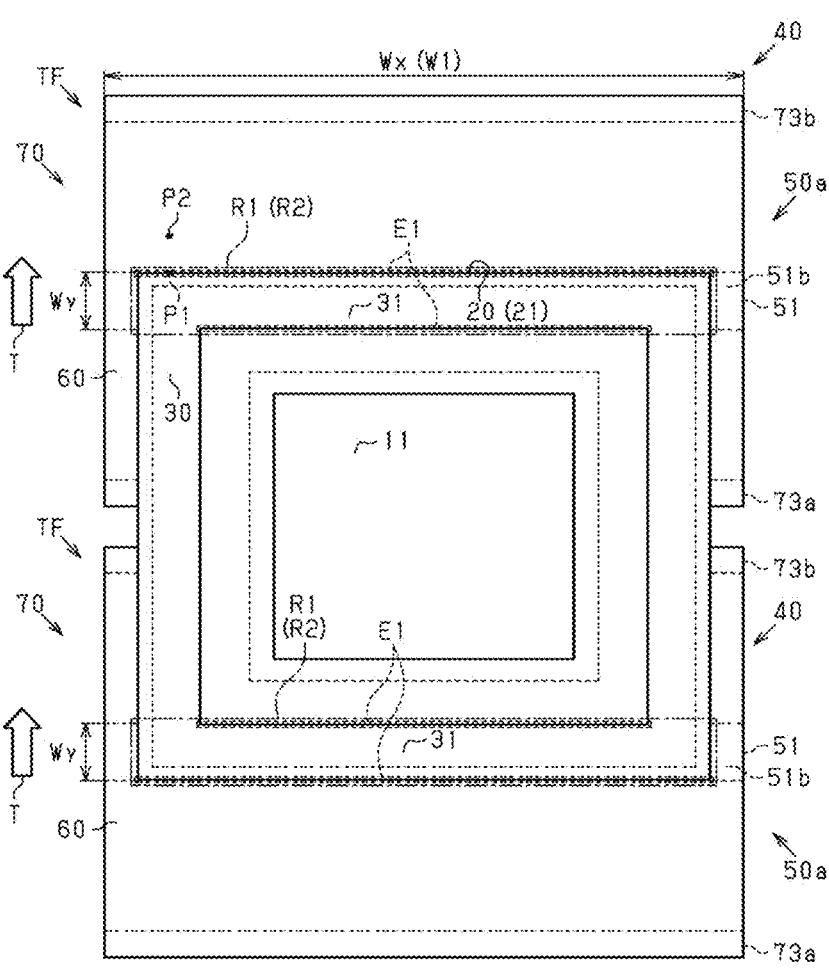
FIG. 10 is a cross-sectional view, taken along line X-X of FIG. 9.
Figure 10:
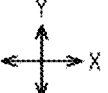

Firstly, as illustrated FIGS. 8 to 10, the moving direction T of the sheet material 60 is different between the first embodiment and the second embodiment. In the first embodiment, the moving direction T of the sheet material 60 supported by the support members 73a, 73b coincides with the long side direction X. In contrast, the moving direction T of the sheet material 60 in the second embodiment coincides with the short side direction Y.

In addition, the width W1 of the sheet material 60 is different between the first embodiment and the second embodiment. In the first embodiment, the width W1 of the sheet material 60 is equal to the length Wy of the short side of the pressing surface 51b. The length Wy of the short side of the pressing surface 51b is greater than the length of the long sides of the resin edge portions 21, 31. Therefore, the width W1 of the sheet material 60 is greater than the length of the long sides of the resin edge portions 21, 31. In contrast, the width W1 of the sheet material 60 in the second embodiment is equal to or greater than the length Wx of the long side of the pressing surface 51b. In detail, the width W1 of the sheet material 60 is equal to the length Wx of the long side of the pressing surface 51b. Therefore, the width W1 of the sheet material 60 in the second embodiment is greater than the width W1 of the sheet material 60 in the first embodiment.

Accordingly, the dimensions and directions of each of members 71, 72, 73a, 73b, 74, 75 forming the moving mechanism 70 change. Regarding the positional relationships among the members 71, 72, 73a, 73b, 74, 75 of the moving mechanism 70 in the second embodiment, the long side direction X in the first embodiment only has to be replaced with the short side direction Y and the short side direction Y in the first embodiment only has to be replaced with the long side direction X.

The following will describe a configuration of the moving mechanism 70 in the second embodiment in detail.
<Unwinder 71>
The unwinder 71 is a reel rotatable around a rotation axis parallel to the long side direction X. The position of the unwinder 71 relative to the lower base 41 and the upper base 43 is the same as that in the first embodiment.

<Unwinding Controller 72>
The first unwinding guide roller 72a, the second unwinding guide roller 72b, and the unwinding dancer roller 72c each are rotatable around their respective rotation axes parallel to the long side direction X.
<Unwinding Guide Rollers 72a, 72b>
Both of the first unwinding guide roller 72a and the second unwinding guide roller 72b are disposed away from the unwinder 71 in the short side direction Y.
<Unwinding Dancer Roller 72c>
The unwinding dancer roller 72c is disposed away in the pressing direction Z from a midpoint between the first unwinding guide roller 72a and the second unwinding guide roller 72b in the short side direction Y.
<Support Members 73a, 73b>
The first support member 73a and the second support member 73b are rotatable around their respective rotation axes parallel to the long side direction X.

The first support member 73a is disposed away from the pressing member 51 in the short side direction Y. A portion of the first support member 73a faces one of the surfaces, extending from the long side of the pressing surface 51b in the pressing direction Z, in the short side direction Y.

The second support member 73b is disposed away from the first support member 73a in the short side direction Y. A portion of the second support member 73b faces one of the surfaces, extending from the long side of the pressing surface 51b in the pressing direction Z, in the short side direction Y. The surface of the pressing member 51 facing the second support member 73b is positioned opposite from the surface of the pressing member 51 facing the first support member 73a in the short side direction Y.
<Winding Guide Rollers 74a, 74b>
The first winding guide roller 74a, the second winding guide roller 74b, and the winding dancer roller 74c each are rotatable around their respective rotation axes parallel to the long side direction X.

Both of the first winding guide roller 74a and the second winding guide roller 74b are disposed away from the winder 75 in the short side direction Y.
Winding Dancer Roller 74c
The winding dancer roller 74c is disposed away, in the pressing direction Z, from a midpoint between the first winding guide roller 74a and the second winding guide roller 74b in the short side direction Y.
<Winder 75>
The winder 75 is a reel rotatable around a rotation axis parallel to the long side direction X. The winder 75 is disposed away from the unwinder 71 in the short side direction Y.
<Moving Direction T of Sheet Material 60>
The second support member 73b is disposed away from the first support member 73a in the short side direction Y. Therefore, the moving direction T in the present embodiment is parallel to the short side direction Y. Since the short side direction Y is perpendicular to the pressing direction Z, the moving direction T of the present embodiment intersects the pressing direction Z.
<Method for Manufacturing Electrode Unit 10>
In the method for manufacturing the electrode unit 10 using the welding device 40 of the second embodiment, processes S1 to S6 similar to those of the first embodiment are performed. The moving direction T corresponds to the long side direction X in the method for manufacturing the electrode unit 10 of the first embodiment, whereas moving direction T corresponds to the short side direction Y in the second embodiment.

Operation of Second Embodiment

The deterioration of the sheet material 60 tends to progress in the resin pressing region R1, especially in the region in contact with the end edge E1 in the sheet material 60. In other words, the deterioration of the sheet material 60 tends to proceed in the region in the sheet pressing regions R2 overlapping the end edge E1 in the plan view in the pressing direction Z. The end edge E1 extends in the long side direction X. Therefore, a region of the sheet material 60 where the deterioration easily progresses tends to be distributed along the long side direction X.

In the second embodiment, the moving direction T intersects the long side direction X. By sliding the sheet material 60 in the moving direction T in the moving process S6, the region of the sheet material 60 in contact with the end edge E1 in the welding process S3 before the moving process S6 is performed is at least partially positioned outside the sheet pressing region R2. Specifically, by sliding the sheet material 60 in the moving direction T, the first point P1 slides to the second point P2. Here, the length Wy of the short side of the pressing surface 51b is shorter than the length Wx of the long side of the pressing surface 51b. Therefore, the moving mechanism 70 can move the region in contact with the end edge E1 in the welding process S3 before the moving process S6 is performed outside the sheet pressing region R2 with a small moving distance as compared to the case where the moving direction T is parallel to the long side direction X.

Effects of Second Embodiment (2-1) The long side direction X is a direction in which the long sides of the pressing surface 51b extend. Additionally, the moving direction T intersects the long side direction X.

According to this, since the moving direction T intersects the long side direction X, the moving distance of the sheet material 60 when sliding the sheet material 60 covering the pressing surface 51b is slid becomes shorter as compared to the case where the moving direction T is parallel to the long side direction X. Accordingly, the time required for replacing the sheet material 60 can be shortened as compared to the case where the moving direction T is parallel to the long side direction X. Thus, the operation efficiency of the welding device 40 may be further increased.

According to this, since the moving direction T intersects the long side direction X, the area of the sheet material 60 that is slid according to the moving distance of the sheet material 60 increases, as compared to the case where the moving direction T is parallel to the long side direction X. Therefore, a larger amount of the sheet material 60 may be slid from the pressing surface 51b in a short travel distance. Thus, the operation efficiency of the welding device 40 may be further increased.

In particular, in the present embodiment, the moving direction T extends along the short side direction Y. In detail, the moving direction T is parallel to the short side direction Y. Accordingly, the moving direction T crosses the long side direction X, and the moving distance of the sheet material 60 when the sheet material 60 covering the pressing surface 51b is slid becomes even shorter as compared to the case where the moving direction T extends along the long side direction X. Thus, the operation efficiency of the welding device 40 may be further increased.

(2-2) The pressing surface 51b of the present embodiment has a rectangular shape. In addition, the resin pressing region R1 has a rectangular shape and has the end edge E1 extending along the long side of the resin pressing region R1.

In this configuration, when the direction in which the end edge E1 extends is set as the long side direction X, the moving direction T intersects the long side direction X.

When the pressing surface 51b presses the resin portions 20, 30 via the sheet material 60, a large load is applied to the region of the sheet material 60 in contact with the end edge E1 of the resin pressing region R1, as compared to the region in contact with the surface of the resin pressing region R1. Therefore, the region of the sheet material 60 in contact with the end edge E1 is more likely to deteriorate as compared to the region in contact with the surface of the resin pressing region R1.

In the present embodiment, the moving direction T intersects the long side direction X. As a result, an overlap of the above-described regions susceptible to deterioration before and after the moving mechanism 70 slides the sheet material 60 becomes smaller. Therefore, localized deterioration of the sheet material 60 may be suppressed.

Modification

The embodiment may be modified as follows. The embodiments and the following modifications may be combined within a technically consistent range.

The methods for manufacturing the electrode unit 10 of the first embodiment and the second embodiment need not include the placing process S2. For example, the electrode plate 11 to which resin portions 20, 30 are placed in advance may be used in the welding process S3.

In the first embodiment and the second embodiment, the moving mechanism 70 may have any configuration as long as the sheet material 60 is supported by the support members 73a, 73b. For example, the moving mechanism 70 need not include the unwinding controller 72 and the winding controller 74.

In the first embodiment and the second embodiment, the support members 73a, 73b need not be formed of the first support member 73a and the second support member 73b. For example, the support members 73a, 73b may be formed by the unwinder 71 and the winder 75. For example, the first support member 73a and the second support member 73b only need be replaced with the unwinder 71 and the winder 75, respectively. In this case, the unwinder 71 and the winder 75 functions as the support members 73a, 73b that support the sheet material 60.

In short, the support portions 73a, 73b need not be configured as a part of the moving mechanism 70, but the support members 73a, 73b themselves May be configured as the moving mechanism 70.

In the first embodiment and the second embodiment, the moving mechanism 70 only needs to include the unwinder 71 and the winder 75, and, for example, need not include the unwinding controller 72, the first support member 73a, the second support member 73b, and the winding controller 74. In this case, the support members 73a, 73b may be provided by using the pressing member 51.

For example, in the first embodiment, if the moving mechanism 70 does not include the first support member 73a and the second support member 73b, the sheet material 60 moves from the unwinder 71 to the winder 75 via the two short sides of the pressing surface 51b. In this case, the sheet material 60 is supported by the two short sides of the pressing surface 51b. The moving mechanism 70 slides the sheet material 60 supported by the two short sides of the pressing surface 51*b* relative to the pressing member 51. Therefore, the two short sides of the pressing surface 51*b* function as the support members 73*a*, 73*b*. In this case, the sheet material 60 may be configured to be slidable relative to the pressing member 51.

Similarly to the first embodiment, when the moving mechanism 70 does not include the first support member 73*a* and the second support member 73*b* in the second embodiment, the two long sides of the pressing surface 51*b* function as the support members 73*a*, 73*b*.

That is, the support members 73*a*, 73*b* need not be composed of rollers such as the first support member 73*a* and the second support member 73*b*, but may be composed of members that allow the sheet material 60 to slide relative the pressing member 51. Therefore, the support members 73*a*, 73*b* may be included in the moving mechanism 70 or may be provided separately from the moving mechanism 70.

In the first embodiment and the second embodiment, the moving direction T of the sheet material 60 supported by the support members 73*a*, 73*b* is not limited to the long side direction X and the short side direction Y, and may be any direction that intersects the pressing direction Z. For example, the moving direction T may be any direction perpendicular to the pressing direction Z.

Figure 11:
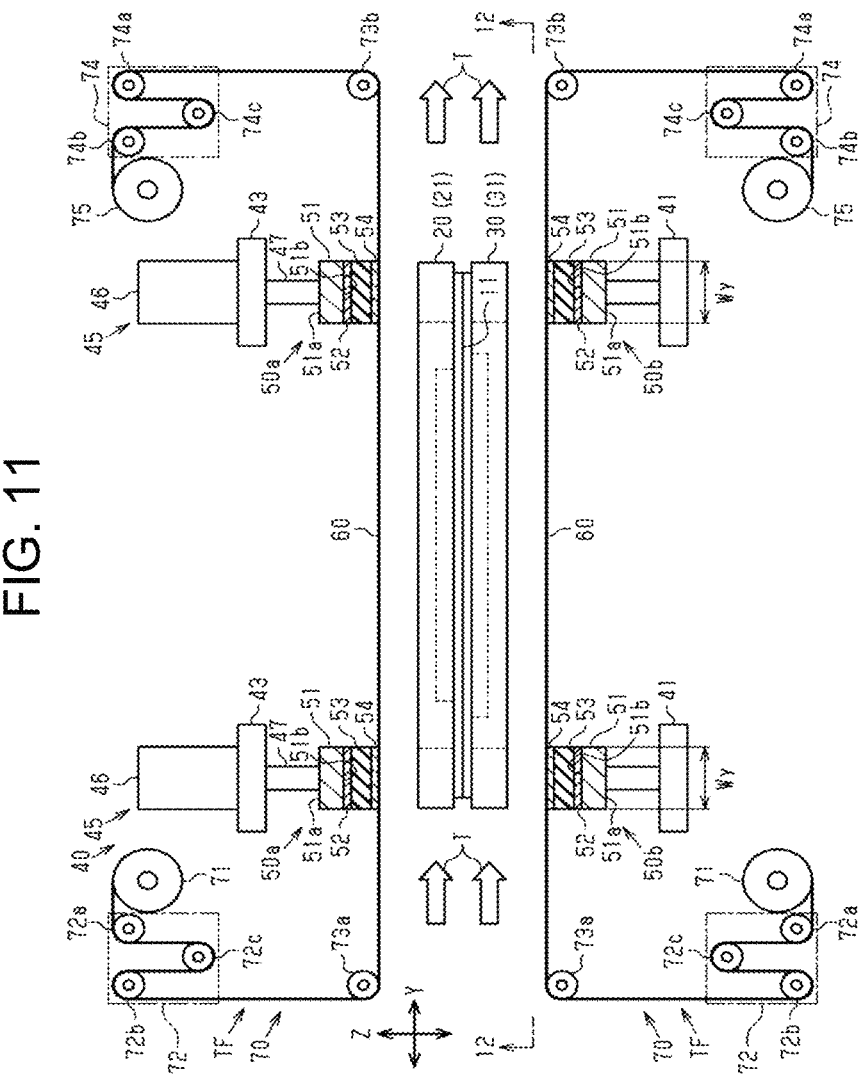
FIG. 11 is a view for describing a welding device of a modification of the second embodiment.
Figure 12:
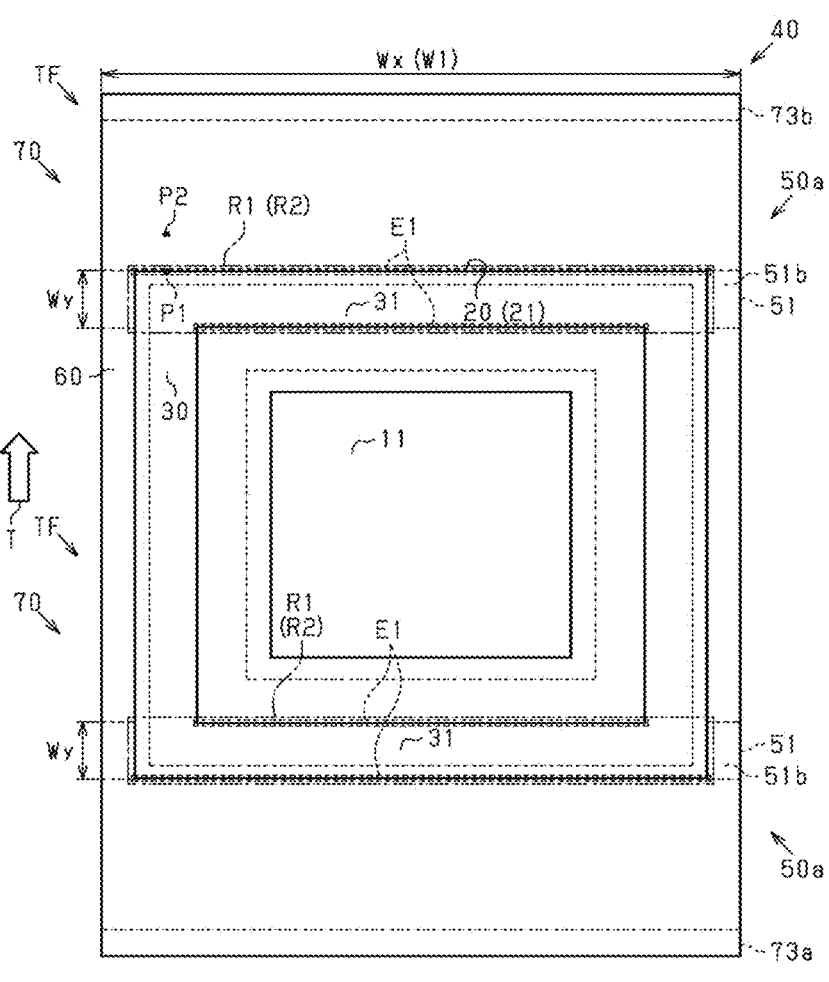
FIG. 12 is a cross-sectional view, taken along line XII-XII of FIG. 11.

As illustrated in FIGS. 11 and 12, in the second embodiment, the support members 73*a*, 73*b* may support the sheet material 60 so that the sheet material 60 extends across the pressing members 51 of a plurality of the first pressing assemblies 50*a* and across the pressing members 51 of a plurality of second pressing assemblies 50*b*, respectively. In this case, the second support member 73*b* of one of the support members 73*a*, 73*b* and the first support member 73*a* of the other of the support members 73*a*, 73*b* may be omitted.

In the first embodiment and the second embodiment, the heating member 54 need not be integrated with the pressing member 51, but may be provided separately from the pressing member 51. In this case, the heating member 54 may heat the resin portions 20, 30 by thermal radiation, for example, by a resistance heater or a heater coil.

In the first embodiment and the second embodiment, the welding device need not include the insulating member 52 and the shock absorption member 53.

In the first embodiment and the second embodiment, the shape of the pressing surface 51*b* is not limited to a rectangular shape, and may be any shape as long as the resin portions 20, 30 may be pressed with the pressing surface 51*b*. The pressing surface 51*b* may be configured to cover the resin portions 20, 30 entirely in plan view in the pressing direction Z. In this case, the pressing member 51 may press the resin portions 20, 30 entirely at once. It is noted that the support members 73*a*, 73*b* only need to support the sheet material 60 so that the sheet material 60 includes the resin portions 20, 30 entirely in the plan view in the pressing direction Z.

Similarly to the pressing surface 51*b*, the shape of the resin pressing region R1 is not limited to a rectangular shape, but may be any shape.

In the first embodiment and the second embodiment, the resin portions 20, 30 are not limited to a rectangular frame body, but may be any shape corresponding to the shape of the electrode plate 11, for example.

In the first embodiment and the second embodiment, the positions of the resin portions 20, 30 relative to the electrode plate 11 may be at any positions as long as the resin portions 20, 30 can be welded to the current collector 12. For example, the resin edge portions 21, 31 need not be disposed along the edges 12*a*, but may be disposed on the first uncoated surface 14*a* or the second uncoated surface 15*a*.

In the first and second implementations, only one of the resin portions 20, 30 may be disposed on the main surface 13.

In the first embodiment and the second embodiment, the electrode plate 11 need not be a so-called bipolar electrode in which the first active material layer 16 and the second active material layer 17 are provided on the first main surface 14 and the second main surface 15. The electrode plate 11 may be a so-called monopolar electrode in which the active material layers 16 and 17 are provided only on one of the first main surface 14 and the second main surface 15, for example.

In the first embodiment and the second embodiment, the electrode plate 11 is not limited to the rectangular one, but may be of any shape such as, for example, a polygon or a circle.

In the first embodiment and the second embodiment, the welding device may have the heating member 54 only in one of the two pressing assemblies 50*a*, 50*b*. Such a welding device 40 can be used, for example, when only one of the resin portions 20, 30 is welded to the electrode plate 11.

The workpiece to which the resin portions 20, 30 are welded using the welding device 40 is not limited to the electrode plate 11, but may be any metal foil, ceramic, wood, and the like.

REFERENCE SIGNS LIST

10 electrode unit
11 electrode plate
12*a* edge
20, 30 resin portion
21, 31 resin edge portion
40 welding device
51 pressing member
51*b* pressing surface
54 heating member
60 shoot material
70 moving mechanism
73*a*, 73*b* support member
R2 sheet pressing region
S3 welding process
S6 moving process
T moving direction
x long side direction
Z pressing direction

The invention claimed is:

1. A welding device that welds a resin portion to a workpiece, the welding device comprising:
   a heating member configured to heat the resin portion to melt the resin portion;
   a seal bar configured to perform a welding process of pressing the resin portion having been melted against the workpiece via a sheet material in a pressing direction to weld the resin portion to the workpiece, and having a pressing surface that presses the sheet material;
   a pair of support members disposed away from each other in a moving direction of the sheet material, the moving direction intersecting the pressing direction, and configured to support the sheet material so that the sheet material covers the pressing surface in the pressing direction;

a moving mechanism comprising a plurality of reels that are rotatable about a rotation axis, the moving mechanism being configured to slide the sheet material supported by the support members in the moving direction; and a control circuit configured to determine whether the sheet material is to be slid based on a number of welding processes endured by the sheet material with respect to a predetermined threshold, the predetermined threshold being set based on a degree of deterioration of the sheet material, and the control circuit being configured to control the moving mechanism so that the sheet material is slid when the number of welding processes endured by the sheet material corresponds to the predetermined threshold.

2. The welding device according to claim 1, wherein the pressing surface has a rectangular shape, a direction in which a long side of the pressing surface extends is set as a long side direction, and the moving direction of the sheet material intersects the long side direction.

3. A method for manufacturing a resin welded workpiece in which a resin portion is welded to a workpiece, the method comprising:

a welding process in which the resin welded workpiece is manufactured by melting the resin portion placed on the workpiece and pressing the resin portion having been melted against the workpiece via a sheet material with a pressing member to weld the resin portion to the workpiece;

a moving process in which the sheet material is slid in a moving direction of the sheet material when the welding process is performed at least once, the moving direction intersecting a pressing direction in which the resin portion is pressed against the workpiece in the welding process; and a moving determination process in which whether the sheet material is to be slid is determined based on a number of welding processes endured by the sheet material with respect to a predetermined threshold, the predetermined threshold being set based on a degree of deterioration of the sheet material, wherein the moving process is performed when the number of welding processes endured by the sheet material corresponds to the predetermined threshold, a region of the sheet material that is pressed by the pressing member in the welding process is defined as a sheet pressing region, and in the moving process, a region of the sheet material different, in the moving direction, from the sheet pressing region in the welding process before the moving process is slid to a position that is to be pressed in the welding process after the moving process.

4. The welding device according to claim 1, wherein the workpiece is a current collector of an electrode plate and has a first main surface and a second main surface, the resin portion includes a first resin portion to be welded to the first main surface of the current collector and a second resin portion to be welded to the second main surface of the current collector, the welding device comprises a first pressing assembly configured to weld the first resin portion to the first main surface of the current collector, and a second pressing assembly configured to weld the second resin portion to the second main surface of the current collector, and the first pressing assembly and the second pressing assembly face each other in the pressing direction.

5. The welding device according to claim 4, wherein each of the first pressing assembly and the second pressing assembly includes a heating member.

6. The welding device according to claim 1, wherein the sheet material has a sheet pressing region that is to be pressed in the welding process, and a second region that is different, in the moving direction, from the sheet pressing region, and the control circuit is configured to, when the number of welding processes endured by the sheet material corresponds to the predetermined threshold, control the moving mechanism to slide the sheet material by a predetermined distance such that the second region is slid to the sheet pressing region.

7. The welding device according to claim 6, wherein the predetermined distance is less than a length of the sheet pressing region in the moving direction such that the sheet pressing region is only partially changed.

* * * * *